(12) United States Patent
Cammack et al.

(10) Patent No.: US 7,067,230 B2
(45) Date of Patent: Jun. 27, 2006

(54) PHOTOREFRACTIVE COMPOSITE

(75) Inventors: J. Kevin Cammack, Oceanside, CA (US); Peng Wang, Vista, CA (US); Seth R. Marder, Atlanta, GA (US); Bernard Kippelen, Decatur, GA (US)

(73) Assignee: Nitto Denko Corporation, Osaka (JP)

( * ) Notice: Subject to any disclaimer, the term of this patent is extended or adjusted under 35 U.S.C. 154(b) by 101 days.

(21) Appl. No.: 10/757,178

(22) Filed: Jan. 14, 2004

(65) Prior Publication Data

US 2004/0200999 A1    Oct. 14, 2004

Related U.S. Application Data

(60) Provisional application No. 60/440,796, filed on Jan. 15, 2003.

(51) Int. Cl.
*G03F 7/004* (2006.01)

(52) U.S. Cl. .................... 430/270.1; 526/239

(58) Field of Classification Search ............ 430/270.1; 526/239
See application file for complete search history.

(56) References Cited

U.S. PATENT DOCUMENTS

| | | | |
|---|---|---|---|
| 5,064,264 A | 11/1991 | Ducharme et al. | |
| 5,361,148 A | 11/1994 | Bjorklund et al. | |
| 6,090,332 A | 7/2000 | Marder et al. | |
| 6,267,913 B1 | 7/2001 | Marder et al. | |
| 6,916,894 B1 * | 7/2005 | Cammack et al. | 526/239 |
| 2003/0234396 A1* | 12/2003 | Halik et al. | 257/72 |
| 2004/0065867 A1* | 4/2004 | Hartmann et al. | 252/301.16 |
| 2005/0209478 A1* | 9/2005 | Cammack et al. | 558/288 |

FOREIGN PATENT DOCUMENTS

| | | | |
|---|---|---|---|
| GB | 1353905 A | * | 5/1974 |
| WO | WO 02/064600 A1 | * | 8/2002 |

OTHER PUBLICATIONS

Markin, V.S. et al; "Polymethine Dyes Derived from Organic Complexes of Boron," Mendeleev Chemistry Journal. vol. 29, No. 4, pp. 121-123, 1984☐☐.*

Hendrickx, Eric, et al., "Photoconductive properties of PVK-based photorefractive polymer composites doped with fluorinated styrene chromophores," *J. Mater. Chem.*, 1999, 9, pp. 2251-2258.

Odian, G., Principles of Polymerization, John Wiley, New York, 2nd Ed., 1981, pp. 7-10.

Okamoto, Kazuo et al., "Synthesis and Characterization of Photorefractive Polymer Containing Electron Transport Material," *Chem. Mater.* 1999, 11, pp. 3279-3284.

U.S. Patent Application Publication No. 03-0220500, dated Nov. 27, 2003.

* cited by examiner

*Primary Examiner*—Amanda Walke
(74) *Attorney, Agent, or Firm*—Knobbe Martens Olson & Bear LLP

(57) ABSTRACT

Polydioxaborine compositions are prepared by intermixing a polydioxaborine and a non-linear optical chromophore. Preferred polydioxaborine compositions are photorefractive and/or photoconductive composites.

25 Claims, No Drawings

PHOTOREFRACTIVE COMPOSITE

RELATED APPLICATION INFORMATION

This application claims priority to U.S. Provisional Application No. 60/440,796, filed Jan. 15, 2003, which is hereby incorporated by reference in its entirety

BACKGROUND OF THE INVENTION

1. Field of the Invention

This invention relates generally to photorefractive materials. More particularly, it relates to photorefractive composites that contain a polydioxaborine.

2. Description of the Related Art

Photorefractive materials are materials that undergo a change in refractive index when illuminated with light. For example, illumination of a photorefractive material with a nonuniform field of light (such as the interference pattern obtained by crossing two coherent light beams) results in the creation of a periodic refractive index modulation (referred to as a grating) inside the material. Photorefractive materials typically display several basic properties: First, such materials are generally capable of photo-charge generation. Illumination of these materials results in the formation of electron/hole pairs (negative and positive charges, respectively). Second, at least one of the charges has mobility in the material. Migration of the most mobile charges from the bright (conducting) regions to the dark (insulating) regions and trapping result in a space-charge field and corresponding periodic electric field. Finally, photorefractive materials have an electro-optic response to the internal space-charge field that gives rise to the refractive index modulation.

A variety of photorefractive materials are known, including inorganic photorefractive materials such as lithium niobate and amorphous photorefractive materials such as photorefractive polymers. Optical devices incorporating photorefractive materials have been fabricated and many have shown promise for applications such as holographic data storage, optical signal amplification, optical switches, and optical correlators. Strong photorefractive responses are typically observed in materials that have high photo-charge generation efficiency, charge transport, and an electro-optical response. The electro-optic response can result from the orientational Kerr effect or from the Pockels effect.

The discovery of a photorefractive effect in organic systems and the subsequent design of organic composites with high diffraction efficiencies has greatly increased the potential market for photorefractive materials. Organic photorefractive materials have been of particular interest because of their structural flexibility and the general ease with which polymers can be fabricated into various shapes suitable for incorporation into devices. However, the photorefractive properties of many of the most promising organic photorefractive material have been found to degrade over time, resulting in relatively short useful lifetimes. Although, in theory, either hole-transport or electron-transport materials can be used in the charge-transport layer in an organic photorefractive composite, in practice only hole-transport materials, particularly polyvinyl carbazole (PVK), have been incorporated into practical devices. Carbazole and other common hole-transport moieties tend to have relatively poor miscibility with polar electro-optic chromophores. The poor miscibility of hole transport materials and electro-optic chromophores is often cited as a cause of the short lifetimes of organic photorefractive materials. Despite extensive efforts to avoid the crystallization or separation of the electro-optic chromophores or to extend the lifetime of hole-transporting organic photorefractive materials, such phase separation remains a significant stumbling block to the commercial development of organic photorefractive materials.

The study of organic electron-transport materials has been limited. The use of an electron-transport moiety as the charge-transport part of a photorefractive material has been reported, see K. Okamata, et al., "Synthesis and Characterization of Photorefractive Polymer Containing Electron-Transport Material," Chem. Mater., Vol. 11, pp. 3279–3284, (1999). These thioxanthene based organic photorefractive materials were reported to have vanishingly small diffraction efficiencies, long response times and, in most cases, low net two-beam coupling gains. Although these materials may be useful in certain applications, there is a long-felt need in the art for an electron-transport photorefractive article having higher diffraction efficiency, higher two-beam coupling gain and a faster response time in combination with good mechanical, optical, and ease-of-fabrication properties.

SUMMARY OF THE INVENTION

The inventors have discovered novel photorefractive compositions comprising polydioxaborines. A preferred embodiment provides a composition comprising a polydioxaborine and an NLO chromophore. Preferably, the polydioxaborine comprises a dioxaborine group of the formula (I)

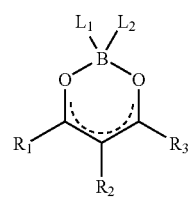

(I)

wherein $R_1$, $R_2$, $R_3$, $L_1$ and $L_2$ are each independently selected from the group consisting of hydrogen, linking atom, electron withdrawing group, and electron donating group.

These and other embodiments are described in greater detail below.

DETAILED DESCRIPTION OF THE PREFERRED EMBODIMENTS

Definitions

A "monomer" is molecule containing one or more polymerizable groups. "Comonomers" are monomers having different chemical structures that may be polymerized together to form a polymer. A "dioxaborine monomer" is a molecule that contains at least one polymerizable group and at least one core $C_3O_2B$ dioxaborine group.

A "polymerizable group" is a chemical group that reacts with itself or other chemical groups to link monomers together to form a polymer, by either chain or step polymerization mechanisms. Examples of polymerizable groups include acrylate, methacrylate, acrylamide, alkene, alkyne, styrene, cyclic N-phenyliminocarbonate, cyclic acid anhydride, sultam, lactam, lactone, and epoxy. In the monomer context, a "reactive group" is a polymerizable group that participates in a step polymerization by reacting with other functional groups. Examples of reactive groups include epoxy, ester, phenol, acid chloride, carbamoyl chloride, sulfonyl chloride, hydrazide, acid anhydride, isothiocyanate, isocyanate, arylbromide, aryltrialkyltin, arylcuprate, arylzinc, alkyne, alkynecuprate, diarylamine and alkene.

A "polymer" is a large molecule that contains recurring units formed by polymerizing monomers. A polymer may be a "homopolymer" comprising recurring units formed by, e.g., polymerizing a particular monomer, or it may be a "copolymer" comprising recurring units formed by, e.g., copolymerizing two or more different monomers. A polymer has a weight average molecular weight of about 1,000 or greater. A "polydioxaborine" is a polymer that contains, as part of its structure, at least one core $C_3O_2B$ dioxaborine group. Polydioxaborines and methods for making them are described in U.S. patent application Ser. No. 10/235,182, filed Sep. 3, 2002, which is hereby incorporated by reference in its entirety and particularly for the purpose of describing polydioxaborines.

A "chain polymerization technique" is a method for making a polymer that proceeds by a chain polymerization mechanism. A "step polymerization technique" is a method for making a polymer that proceeds by a step polymerization mechanism. A more detailed description of these terms is found in G. Odian, Principles of Polymerization, John Wiley, New York, $2^{nd}$ Ed., 1981, pp. 7–10. Chain polymerization techniques are often referred to by the type of initiation employed. Examples of chain polymerization techniques include radical polymerization, anionic polymerization, cationic polymerization, and transition metal catalysis (including ring-opening metathesis polymerization).

An "aromatic group" is a cyclic group of carbon atoms that contains $4n+2\pi$ electrons where n is an integer. A "heteroaromatic group" is a cyclic group of atoms, with at least one atom within the ring being an element other than carbon, that contains $4n+2\pi$ electrons where n is an integer. A more extended description of aromaticity and heteroaromaticity can be found in J. March, Advanced Organic Chemistry: Reactions, Mechanisms and Structure, Fourth edition, Wiley-Interscience, New York, 1992, Chapter 2, which is incorporated herein by reference. A "heteroatom" is an atom in group IV, V, VI, or VII in the periodic table other than carbon, such as Nitrogen, Oxygen, Silicon, Phosphorous or Sulfur.

A "linking atom" is an atom that is capable of bonding to more than one other atom. Examples of linking atoms are carbon, silicon, nitrogen, phosphorous, oxygen and sulfur. A "linking group" is a group that contains a linking atom. Examples of linking groups that contain a carbon linking atom are —$CH_2$—, —CH=, and —C≡, as well as the —CH= groups in aromatic rings, e.g., —$C_6H_4$—O— and —$C_6H_4$—. Examples of linking groups that contain a nitrogen linking atom are —N= and —NH—. Examples of linking groups that contain a sulfur linking atom are —S— and —$SO_2$—. Examples of linking groups that contain an oxygen linking atom are —O—, —O—$C_6H_4$—, and —O—$SO_2$—O—. The terms "linking atom" or "linking group" are used herein to refer to an atom or group, respectively, through which the core $C_3O_2B$ dioxaborine group is attached to other groups, e.g., the rest of the polydioxaborine or monomer in which the core $C_3O_2B$ dioxaborine group is contained.

The symbols "‡" and "*" in a chemical structure identify the atom of attachment to a another group and indicates that the structure is missing a hydrogen that would normally be implied by the structure in the absence of the symbol.

A "ligand" is a chemical group that can be covalently or electrostatically bound to the boron atom. A "bridge" it is relatively non-reactive molecular fragment that connects two or more chemical groups. A "π-conjugated bridge" is a bridge containing π-bonds that allow delocalization of electrons along the bridge. Examples of a π-conjugated bridges include —CH═CH— and —CH═CH—CH═CH—. A "bridging ligand" is a structure having two or more ligands that are connected by a bridge and which complex to the same boron center. The term "bridging ligand" may be used synonymously with the term "chelating ligand" herein.

An "electron donating group" or "donor" is a chemical group that delocalizes electron density towards the group to which it is attached. An "electron accepting group" (EAG) or "acceptor" is a chemical group that attracts electron density from the group to which it is attached. In this context, a hydrogen substituent is neither electron donating nor electron withdrawing. A more detailed description of these terms is found in J. March, Advanced Organic Chemistry: Reactions, Mechanisms and Structure, Fourth Edition, Wiley-Interscience, New York, 1992, Chapter 9, which is incorporated herein by reference.

A "chromophore" is a molecule or aggregate of molecules that can absorb electromagnetic radiation. An "excited state" is an electronic state of a molecule in which the electrons populate an energy state that is higher than another energy state for the molecule.

An "NLO chromophore" (or non-linear optical chromophore) is a chromophore that exhibits a non-linear optical response to an electric field induced polarization. The induced polarization of the chromophore P is a nonlinear function of the electric field strength E and can be approximated by the Taylor series expansion in equation (1):

$$P = \alpha E + \frac{1}{2}!\beta E^2 + \frac{1}{3}!\gamma E^3 + \ldots \quad (1)$$

where E is the electric field strength, α is the linear polarizability, β is the first hyperpolarizability and γ is the second hyperpolarizability. Second order nonlinear optical effects arise from the $\frac{1}{2}!\beta E^2$ term of equation 1 and occur only in noncentrosymmetric molecules.

The relative photorefractive response of an NLO chromophore can be determined as described in U.S. Pat. No. 6,090,332 from the photorefractive figure of merit (FOM) of the chromophore as determined by equation 2:

$$FOM - \frac{2}{9kT}\mu^2 \Delta\alpha + \mu\beta \quad (2)$$

where kT is the thermal energy, Δα is polarizability anisotropy of the chromophore ($\Delta\alpha = \alpha_{zz} - \alpha_{xx}$), where z is the direction of the molecular axis, $\alpha_{zz}$ is the polarizability along the direction of the molecular axis of the molecule and $\alpha_{xx}$ is the polarizability in a direction in the plane normal to z, μ is the dipole moment of the NLO chromophore and β is the hyperpolarizability of the chromophore. U.S. Pat. No. 6,090,332 is hereby incorporated by reference in its entirety and particularly for the purpose of describing the relative photorefractive response of an NLO chromophore.

A "photoconductive" material is a material having a degree of electrical conductivity that changes when the material is exposed to electromagnetic radiation. A photorefractive material is a photoconductive material having a refractive index that changes when the material is exposed to electromagnetic radiation.

A "charge-transfer complex" is a complex of two or more molecules that are weakly bound together by electrostatic interactions. Charge-transfer complexes are typically formed when a donor molecule with an occupied molecular orbital ($\phi_D$) is close to an acceptor molecule with an empty molecular orbital ($\phi_A$) and the ionization potential (Ip) of $\phi_D$ in the donor is greater than the electron affinity of $\phi_A$ of the acceptor. In a charge-transfer (CT) complex, the molecular orbitals of the donor and the acceptor overlap giving rise to a new set of molecular orbitals for the CT complex. Most commonly, the orbitals of interest are the highest occupied molecular orbital (HOMO) and the lowest unoccupied molecular orbital (LUMO) of the donor and acceptor, respectively. The HOMO of the CT complex is expected to have a lower energy than $\phi_B$, while the LUMO of the CT complex is expected to have a higher energy than $\phi_A$.

A "charge-transfer band" is an electronic transition exhibited by a charge-transfer complex. Generally, the formation of a charge-transfer complex results in a new electronic transition called the charge-transfer band. The wavelength of the charge-transfer band depends on the Ip of the donor and the electron affinity ($EA_v$) of the acceptor. More complete discussions of the theoretical and practical aspects of charge-transfer complexes are available in "Spectroscopy and Structure of Molecular Complexes," Yarwood, J. Ed.; Plenum Press, New York, 1973 and "Molecular Association, Including Molecular Complexes," Foster, R., Ed.; Academic Press, New York, 1973.

Polydioxaborines

A polydioxaborine is a polymer that contains, as part of its structure, at least one core $C_3O_2B$ dioxaborine group. The $C_3O_2B$ dioxaborine groups in the polymer can be attached directly to one another, and/or the polymer can contain other chemical groups in addition to the core $C_3O_2B$ dioxaborine group. For example, in a preferred embodiment, the core $C_3O_2B$ dioxaborine group contains one or more substituents $L_1$, $L_2$, $R_1$, $R_2$ and $R_3$ as shown in structure (I):

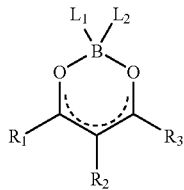

In structure (I), it will be understood by those skilled in the art that the dashed line indicates a delocalization of charge and the actual structure is the sum of the various resonance structures. To incorporate the core $C_3O_2B$ dioxaborine group into the polymer, it is preferred that one or more of the substituents $L_1$, $L_2$, $R_1$, $R_2$ and $R_3$ is a linking atom or linking group through which the core $C_3O_2B$ dioxaborine group is attached to the rest of the polymer. For example, the core $C_3O_2B$ dioxaborine group can be incorporated into the main chain and/or the side chain of the polydioxaborine polymer by further attachment of the $L_1$, $L_2$, $R_1$, $R_2$ and/or $R_3$ substituents to one another or other groups.

Substituents $L_1$, $L_2$, $R_1$, $R_2$ and $R_3$ in structure (I) may represent a variety of chemical groups. Preferably, $L_1$ and $L_2$ are each independently selected from the group consisting of hydrogen, linking atom, electron withdrawing group, and electron donating group. Specific examples of groups that $L_1$ and $L_2$ can each independently represent include hydrogen, linking atom, halogen (e.g., F, Cl, Br, etc.), $C_1$–$C_6$ alkyl, $C_6$–$C_{10}$ alkoxy, $C_6$–$C_{10}$ $$ aryl, $C_6$–$C_{10}$ aryloxy, $C_1$–$C_6$ thioalkyl, nitrile, $C_1$–$C_6$ acyloxy (e.g., acetyloxy, propionyloxy, etc.), amino, $C_1$–$C_6$ alkylamino, $C_2$–$C_{12}$ dialkylamino, and sulfoxide.

$L_1$ and $L_2$ can together represent a bridging ligand. Non-limiting examples of preferred bridging ligands include the following:

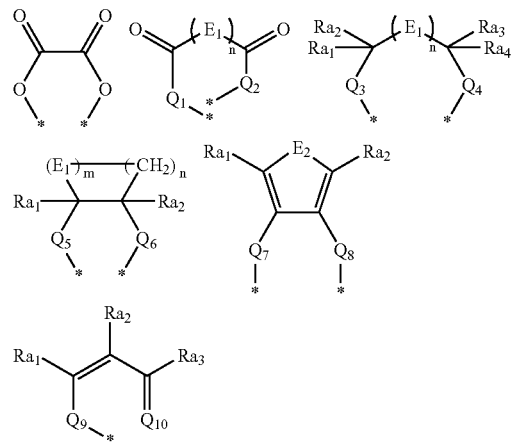

where $Q_{1-10}$ each independently represents a heteroatom, preferably oxygen, capable of forming a covalent or electrostatic bond to boron; where $E_1$ is preferably selected from: $(CR_{a1}R_{a2})_n$, $CR_{a1}$=$CR_{a2}$, C≡C, O, S, N—$R_{a3}$ and N=N; where $E_2$ is preferably selected from: $(CR_{a1}R_{a2})_n$, $CR_{a1}$=$CR_{a2}$, O, S, N—$R_{a3}$ and N=N; where m and n are each independently integers in the range of 1 to 10; and where $R_{a1}$, $R_{a2}$, $R_{a3}$, and $R_{a4}$, are preferably each independently H or a linear or branched alkyl group with up to 18 carbons.

Preferably, $R_1$, $R_2$ and $R_3$ in structure (I) are each independently selected from the group consisting of hydrogen, linking atom, electron withdrawing group, and electron donating group. Examples of $R_1$, $R_2$, and $R_3$ include hydrogen, linking atom, carboxylate, carboxylic acid, aldehyde, amide, epoxy, acid chloride, anhydride, nitrile, sulfonate, sulfonic acid, phosphonate, nitrate, nitro, $C_1$–$C_{18}$ alkoxy, $C_1$–$C_{18}$ alkyl, $C_1$–$C_{18}$ fluoroalkyl, hydroxyl, $C_{12}$–$C_{20}$ diarylamino, $C_2$–$C_{10}$ dialkylamino, $C_1$–$C_6$ alkylhalide, $C_1$–$C_6$ nitroalkyl, $C_1$–$C_6$ alkanoic acid, $C_1$–$C_6$ alkylamide, $C_6$–$C_{10}$ aryl, $C_6$–$C_{10}$ aryloxy, $C_7$–$C_{20}$ alkylaryl, and $C_7$–$C_{20}$ alkylaryloxy.

When the core $C_3O_2B$ dioxaborine group is positively charged, an anion is typically associated with the group to achieve overall electroneutrality of the resulting complex. Examples of suitable anions include F$^-$, Cl$^-$, Br$^-$, I$^-$, $CH_3COO^-$, $CF_3SO_3^-$, $NO_3^-$, $BF_4^-$, $PF_6^-$, $SbF_6^-$, $SbCl_4^-$, and $B(C_6H_5)_4^-$.

The core $C_3O_2B$ dioxaborine group may be incorporated into the structure of the polydioxaborine by polymerizing or copolymerizing monomers that contain the core $C_3O_2B$ dioxaborine group. Various preferred ways of making dioxaborine monomers and polymers are discussed below.

Dioxaborine Monomers

A dioxaborine monomer is a molecule that contains at least one polymerizable group and at least one core $C_3O_2B$ dioxaborine group. Preferred dioxaborine monomers contain a dioxaborine of the structure (I) in which a least one of $L_1$, $L_2$, $R_1$, $R_2$ and $R_3$ is a polymerizable group, or a linking atom through which the dioxaborine of the structure (I) is attached to the polymerizable group. Preferred methods for making dioxaborine monomers are discussed below.

A preferred dioxaborine monomer synthesis method proceeds by first forming the dioxaborine group as illustrated in Scheme (IIa) below for $L_1=L_2=F$:

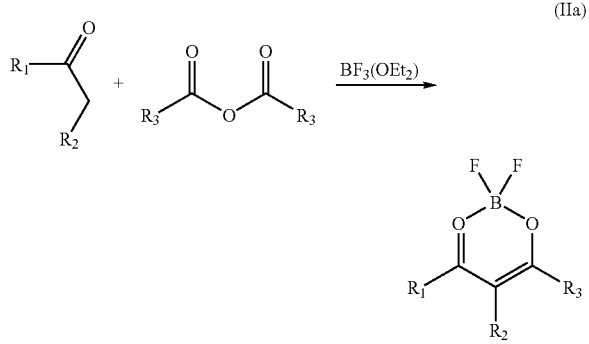

The reactants in Scheme (IIa) can be purchased from commercial sources or readily synthesized by methods known to those skilled in the art. The reaction is preferably conducted by combining the reactants in an excess of acid anhydride at a temperature in the range of 40–80° C. for a period of time in the range of about 2–24 hours. Following cooling, the product is preferably isolated by filtration of the precipitated product from the reaction mixture or, in the case of materials soluble in the acid anhydride, by removal of the acid anhydride, optionally washing the residue with water, and chromatographic separation. Preferably, chromatographic separation is achieved by elution of the product from silica or alumina with an organic solvent or mixture of organic solvents such as ethyl acetate, hexane, methylene chloride and/or toluene.

Another preferred dioxaborine monomer synthesis method proceeds by first forming the dioxaborine group as illustrated in Scheme (IIb) below for $L_1=L_2=F$, alkoxy, OH, CN, fluoroalkyl, alkyl, aryl, thiolate, sulfonyl, etc. $BL_3S$ represents the complex $BL_3$ which may optionally be a neutral solvent adduct of $BL_3$, for example $BF_3(OEt_2)$ (when L=F); the neutral compound $BL_3$; or an ionic complex $BL_3X$ where X=H, CN, alkoxy, L, etc.:

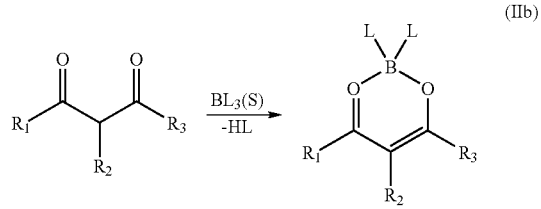

The reactants in Scheme (IIb) can be purchased from commercial sources or readily synthesized by methods known to those skilled in the art. In a preferred method, the diketone is dissolved in an organic solvent such as dichloromethane or acetic acid, preferably of low polarity (7>ϵ>2) (where ϵ is the relative permittivity at 20° C.). Preferably, the solvent forms an azeotrope with the protonated form of L or has a higher boiling point than L. An approximately equimolar quantity of $BL_3$ is then added to the reaction mixture. The reaction vessel is fitted with a condenser and the reaction mixture is heated. The HL formed on condensation of the diketone and the $BL_3$ is distilled out of the reaction mixture until the reaction is complete. After cooling, the product is preferably isolated by filtration of the precipitated product from the reaction mixture or, in the case of products soluble in the reaction solvent, by optionally washing the reaction mixture with water, followed by chromatographic separation. Preferably, chromatographic separation is achieved by elution of the product from silica or alumina with an organic solvent or mixture of thereof such as ethyl acetate, hexane, methylene chloride and/or toluene.

Another preferred dioxaborine monomer synthesis method proceeds by first forming the dioxaborine group as illustrated in Scheme (IIc) below in which $L_1=L_2=Cl$, Br, CN, fluoroalkyl, etc., R is alkyl and $BL_3S$ represents the complex $BL_3$ which optionally may be a neutral solvent adduct of $BL_3$, or preferably the neutral compound $BL_3$.

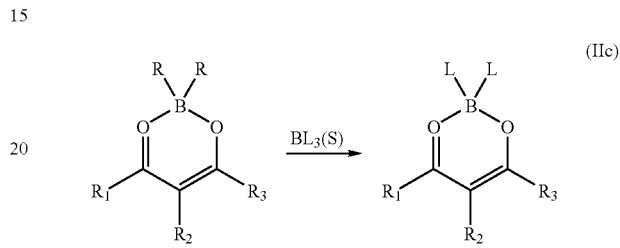

The reactants in Scheme (IIc) can be purchased from commercial sources or readily synthesized by methods known to those skilled in the art such as those described in Scheme IIb. In a preferred method, the dialkylborondiketonate is dissolved in a organic solvent such as chloroform, preferably aprotic and of relatively low polarity (7>ϵ). Preferably, the product is not soluble in the reaction solvent. The solution of dialkylborondiketonate is added to a solution containing between one and 10 equivalents of $BL_3$ maintained at a constant temperature between −78 and 35° C. The reaction mixture is allowed to stir for 3–24 hours at whichtime the precipitated product can be isolated by filtration. Alternately, during the course of the reaction, a less polar solvent such as pentane or carbon tetrachloride may be added to precipitate the product. The product may then be further purified by crystallization from a suitable organic solvent or mixture.

Another preferred dioxaborine monomer synthesis proceeds by first forming the dioxaborine group as illustrated in Scheme (IId) below for bridging ligand $L_1,L_2$=bridging diol, bridging diacid, bridging bis(diarylamine), bridging bis(dialkylamine), etc.:

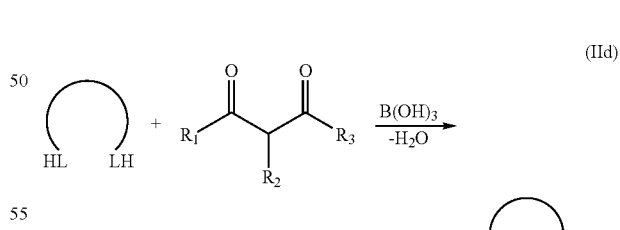

The reactants in Scheme (IId) can be purchased from commercial sources or readily synthesized by methods known to those skilled in the art. In a preferred method, the diketone is dissolved in an organic solvent such as toluene or dichloroethane which preferably forms an azeotrope with water. An approximately equimolar quantity of bridging ligand and boric acid is added to the reaction mixture. The reaction vessel is fitted with a condenser and the reaction mixture is heated to reflux. The water byproduct is removed from the reaction mixture by azeotropic distillation or is directly distilled out of the reaction mixture for 3–48 hours. The precipitated product can be isolated by filtration or, in the case of products soluble in the reaction solvent, by optionally precipitating the reaction mixture with water, followed by crystallization. The product may then be further purified by recrystallization from a suitable organic solvent or mixture of solvents.

Preferably, at least one of $L_1$, $L_2$, $R_1$, $R_2$ and/or $R_3$ in the product of Scheme (II) contains or is modified to contain a functional group that facilitates subsequent attachment to a polymerizable group. Preferably, $R_1$ contains or is modified to contain a hydroxyl, thiol, acid, acid chloride, or aldehyde group that facilitates attachment to a polymerizable group by forming an ester, ether or amide bond. For example, Scheme (III) below illustrates the reaction of acryloyl chloride with the product of Scheme (II) to form a dioxaborine monomer in which the dioxaborine group is attached to a polymerizable acrylate group:

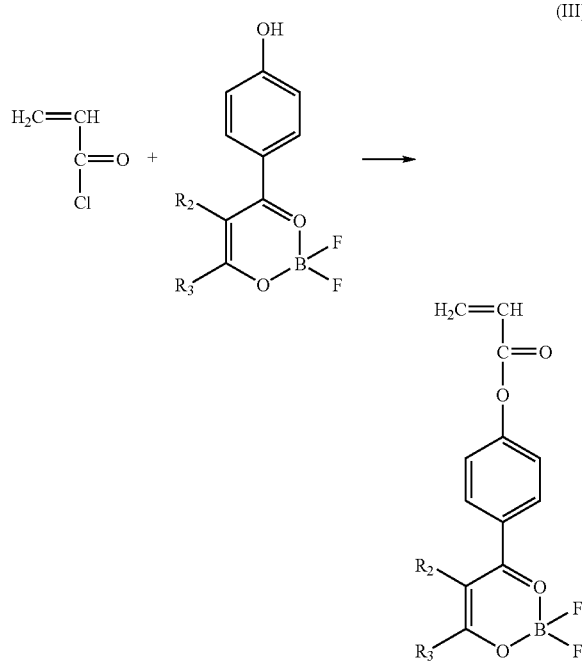

(III)

The reaction between acryloyl chloride and the product of Scheme (II) is preferably performed under dry conditions in an aprotic solvent. Those skilled in the art will understand that the dioxaborine monomer that is the product of Scheme (III) contains a dioxaborine of the formula (I) in which the carbon in the phenyl ring to which the dioxaborine ring is attached is a linking carbon atom.

Another preferred dioxaborine monomer synthesis method proceeds by the direct condensation of the dioxaborine monomer, as illustrated in Scheme (IVa) below in which $L_1=L_2=F$ and at least one of $R_1$, $R_2$ $R_3$ is a linking atom or polymerizable group as defined above:

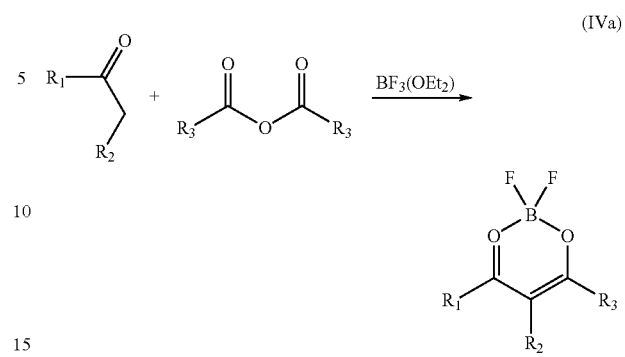

(IVa)

The reaction illustrated in Scheme IVa can be carried out in the same general manner described above for Scheme IIa.

Another preferred dioxaborine monomer synthesis proceeds as illustrated in Scheme (IVb) in which bridging ligand $L_1$,$L_2$=bridging diol, bridging diacid, bridging bis (diarylamine), bridging bis(dialkylamine), etc., and at least one of L, $R_1$, $R_2$ $R_3$ is a polymerizable group as defined above:

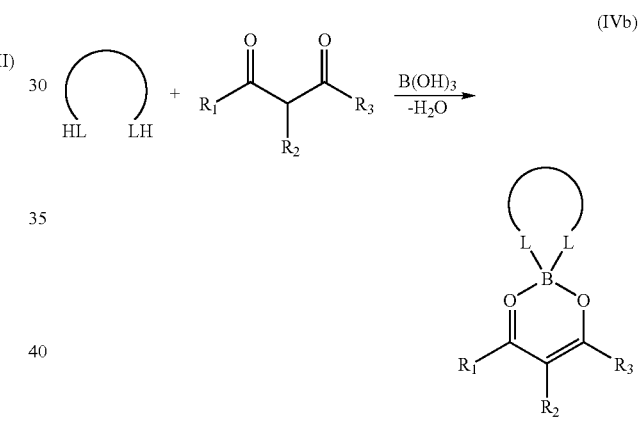

(IVb)

The reaction illustrated in Scheme IVb can be carried out in the same general manner described above for Scheme IId.

Preparation of Polydioxaborines

Polydioxaborines can be prepared in various ways. In a preferred embodiment, polydioxaborines are prepared by using a chain polymerization technique to polymerize a dioxaborine monomer. In another preferred embodiment, polydioxaborines are prepared by using a step polymerization technique to polymerize a dioxaborine monomer. Both of these embodiments are described in greater detail below. Those skilled in the art will understand that the identity of the substituents on the core $C_3O_2B$ dioxaborine group, e.g., $L_1$, $L_2$, $R_1$, $R_2$ and $R_3$ in formula (I), and the nature of the linkage between the core $C_3O_2B$ dioxaborine group and the polymerizable group is provided in the description of the dioxaborine monomers above. For ease of illustration, various dioxaborine monomers discussed below are represented by a polymerizable group attached to a box labeled "DB". In these illustrations, DB represents a chemical group that comprises the core $C_3O_2B$ dioxaborine group, and preferably represents a group of the formula (I). Details regarding the nature of DB and its linkage to the polymerizable group or the resulting polymer may be understood by reference to the descriptions of the corresponding monomers above.

In a preferred embodiment, polymerization is accomplished by using a chain polymerization technique, more preferably a chain polymerization technique selected from the group consisting of radical polymerization, cationic polymerization, and transition metal catalysis. Acrylates, methacrylates and acrylamides are preferably polymerized by radical polymerization as shown schematically in Scheme (V):

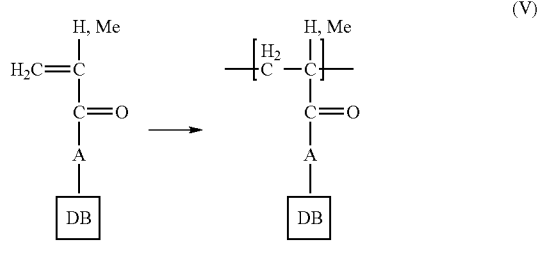

(V)

Styrenes may be polymerized by cationic polymerization or transition metal catalysis, preferably by radical polymerization, as shown in Scheme (VI):

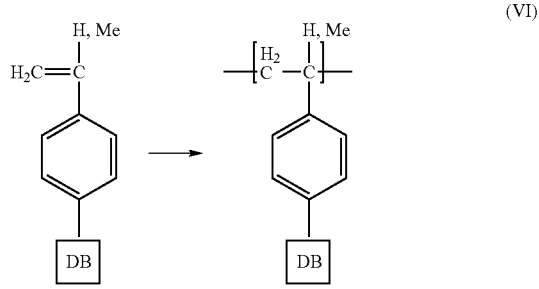

(VI)

Alkynes are preferably polymerized by transition metal catalysis or radical polymerization, and alkenes are preferably polymerized by transition metal catalysis, as illustrated in Scheme (VII):

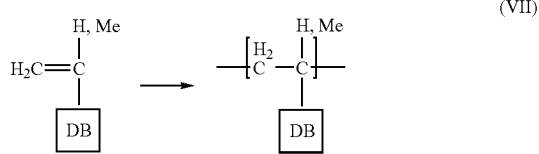

(VII)

Transition metal catalysis can also proceed by a ring opening metathesis polymerization mechanism (ROMP), as illustrated in Scheme (VIII) for a dioxaborine monomer having an cyclopentenyl polymerizable group. For polymerization by ROMP, the dioxaborine monomer preferably comprises a cyclic polymerizable group containing an alkene, more preferably a carbocyclic alkene selected from the group consisting of norbornadienyl, cyclopropenyl, cyclobutenyl, cyclopentenyl, and norbornenyl.

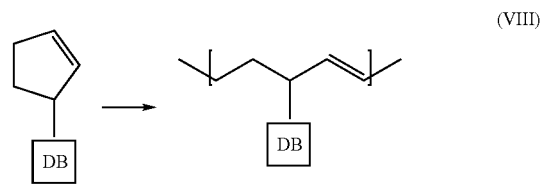

(VIII)

Cyclic N-phenyliminocarbonate, cyclic acid anhydride, sultam, lactam, lactone, and cyclic ether polymerizable groups are preferably polymerized by cationic polymerization that proceeds by ring-opening of the polymerizable group. For example, Scheme (IX) illustrates the cationic ring-opening polymerization of a dioxaborine monomer having an epoxy polymerizable group:

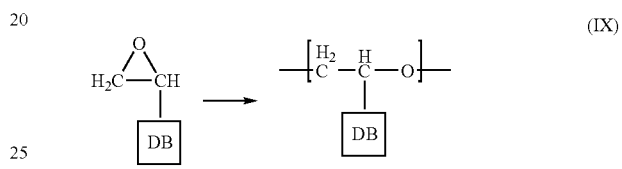

(IX)

Free radical polymerization may be conducted in various solvents or in the bulk state and is preferably performed by intermixing a free radical initiator with the monomers. The amount of free radical initiator is preferably in the range of about 0.001% to about 1%, by weight based on monomer weight, depending on the efficiency of the initiator and the molecular weight desired for the resulting polymer. Various free radical sources known in the art may be used, including thermal initiators that contain an O—O, S—S, N—O or N=N bond, e.g., acyl peroxides such as acetyl peroxide and benzoyl peroxide, as well as azo compounds such as azobisisobutyronitrile (AIBN); and redox initiators that comprise a reductant and an oxidant, e.g., peroxides in combination with reducing agent such as ferrous ion, and combinations of inorganic reductants and oxidants, e.g., combinations of reductants such as $HSO_3^-$, $SO_3^{2-}$, $S_2O_3^{2-}$, and $S_2O_5^{2-}$ with oxidants such as $Ag^+$, $Cu^{2+}$, $Fe^{3+}$, $ClO_3^-$, and $H_2O_2$. If a solvent is used, it is preferred that the solvent have a low chain transfer constant if high molecular weight polymers are desired, preferably a chain transfer constant lower than the chain transfer constant of the monomer. If the polymer molecular weight is higher than desired, chain transfer agents may be added as needed to control molecular weight. Preferred chain transfer agents include triethylamine, di-n-butyl sulfide, and di-n-butyl disulfide.

Cationic polymerization may be conducted in various solvents and is preferably performed by intermixing an acid with the monomers. The amount of acid is preferably in the range of about 0.001% to about 1%, by weight based on monomer weight, depending on the molecular weight desired for the resulting polymer. Suitable acids include protonic acids and Lewis acids. Protonic acids preferably comprise an anion that is not highly nucleophilic, to reduce termination of the growing polymer chain by combination. Preferred protonic acids include perchloric, sulfuric, phosphoric, fluoro- and chlorosulfonic, methanesulfonic and trifluoromethanesulfonic. Lewis acids are preferred for obtaining high molecular weight polymers. Preferred Lewis acids include metal halides (e.g., $AlCl_3$, $BF_3$, $SnCl_4$, $SbCl_5$, $ZnCl_2$, $TiCl4$, and $PCl_5$), organometallic derivatives (e.g., RAlCl$_2$, R$_2$AlCl, R$_3$Al, where R is C$_1$–C$_5$ alkyl), and oxyhalides (POCl$_3$, CrO$_2$Cl, SOCl$_2$, and VOCl$_3$). Polymerization using Lewis acids is preferably conducted in a polar aprotic solvent such as tetrahydrofuran that contains a small amount of a proton donor such as water or an alcohol, or more preferably a small amount of a cation donor such as t-butyl chloride.

Polymerization by transition metal catalysis is preferably conducted by intermixing the monomers with a transition metal catalyst. The amount of transition metal catalyst is preferably in the range of about 0.001% to about 1%, by weight based on monomer weight. Preferred transition metal catalysts comprise a Group I–III organometallic compound (or hydride) and a compound of a Group IV–VIII transition metal. Examples of suitable Group I–III organometallic compounds include R$_n$AlCl$_{3-n}$, R$_2$Be, R$_2$Mg, RLi, R$_4$AlLi, RNa, R$_2$Cd, R$_3$Ga and phenylmagnesium bromide, where n is 1, 2 or 3 and R is C$_1$–C$_5$ alkyl. Examples of Group IV–VIII transition metal compounds include TiCl$_4$, TiCl$_3$, TiBr$_3$, VCl$_4$, VCl$_3$, R$_2$TiCl$_2$, Ti(OR)$_4$, Ti(OH)$_4$, MoCl$_5$, NiO, CrCl$_3$, ZrCl$_4$, WCl$_6$, and MnCl$_2$, where R is C$_1$–C$_5$ alkyl. Since many of these compounds are water sensitive, polymerizations are preferably conducted in dry aprotic solvents such as alkanes, tetrahydrofuran, dioxane, etc.

Copolymerizations can be conducted using chain polymerization techniques and various mixtures of monomers. Preferably, a dioxaborine monomer is intermixed with a comonomer and polymerized as described above to form a copolymer. The comonomers can be intermixed prior to polymerization, or added over the course of the polymerization, individually or in combination. Suitable comonomers include the dioxaborine monomers described herein, as well as other monomers. Preferably, copolymerizations are conducted using comonomers having mutually compatible polymerizable groups, so that a desirable distribution of comonomer recurring units in the resulting copolymer is obtained. Monomers copolymerizable with the dioxaborine monomers described herein thus include C$_1$–C$_{18}$ alkyl acrylates, C$_1$–C18 alkyl methacrylates, C$_2$–C$_6$ hydroxyalkyl acrylates, C$_2$–C$_6$ hydroxyalkyl methacrylates, styrene, C$_1$–C$_5$ substituted styrenes, acrylamide, C$_1$–C$_4$ substituted acrylamides, acetylene, ethylene, vinyl halide, tetrafluoroethylene, vinyl acetate, butadiene, C$_1$–C$_{18}$ alkyl-substituted 1-alkenes, C$_1$–C$_{18}$ alkoxy-substituted 1-alkenes, C$_7$–C$_{14}$ cyclic N-phenyliminocarbonate, C$_1$–C$_{10}$ cyclic acid anhydride, C$_1$–C$_{10}$ sultam, C$_1$–C$_{10}$ lactam, C$_1$–C$_{10}$ lactone, and C$_1$–C$_{10}$ cyclic ether (e.g., epoxy).

Amounts of comonomers used are preferably in the range of nil to about 99.9%, more preferably about 0.01% to about 25%, by weight based on total weight of monomers, to produce copolymers having the corresponding levels of recurring units. More preferably, the comonomer content (if any) is adjusted to control the properties of the resulting polymer, e.g., to adjust solubility, glass transition temperature (Tg), melting point, and/or semiconducting properties. For example, copolymerization of a dioxaborine monomer with 2-ethylhexylacrylate has been found to produce a copolymer having a Tg that is lower than the homopolymer formed by polymerization of the dioxaborine monomer alone. Excessive amounts of 2-ethylhexylacrylate, however, tend to adversely affect the semiconducting properties of the polymer.

In another preferred embodiment, polydioxaborines are prepared by a step polymerization technique. Step polymerizations are preferably conducted using dioxaborine monomers that contain two reactive groups, although small amounts of monomers containing lesser or greater numbers of reactive groups, e.g., one or three, may also be present. The reactive groups are selected so that they react with one another in high yield to form a chemical bond or group that links the monomers together to form a polymer. For example, hydroxyl groups react with carboxylic acids, acid halides, or alkyl esters to form ester linkages, and with sulfonyl halides to form sulfonic acid esters. The two different reactive groups can be present on the same monomer or on different monomers. For example, polydioxaborines that contain ester linkages can be made using a dioxaborine monomer that contains an acid chloride reactive group and a hydroxyl reactive group as shown in Scheme (X):

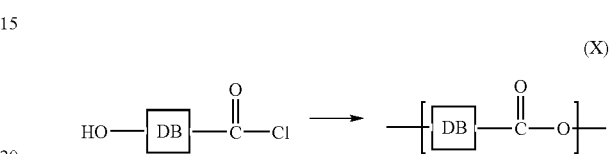

Polydioxaborines that contain ester linkages can also be made using two different dioxaborine monomers, one containing the hydroxyl groups and the other containing the carboxylic acid, acid chloride, or alkyl ester groups, e.g., as shown in Scheme (XI).

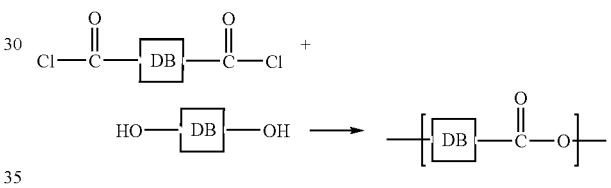

For ease of illustration, the polymerization of dioxaborine monomers to form polydioxaborines may be illustrated below by reference to one of these methods, e.g., by using a dioxaborine monomer that contains both types of reactive groups as in Scheme (X). Those skilled in the art will understand that the description below of either method applies to both methods, unless otherwise stated, e.g., that the reactive groups can also be on different monomers as shown in Scheme (XI). In many cases, a monomer that contains two different reactive groups is preferred because its use leads to a balanced stoichiometry and higher molecular weights. However, such a monomer may be more difficult to prepare or obtain, and thus the use of monomers that differ from each other may be preferred in some cases. Those skilled in the art further understand that, when two different monomers are used, e.g., as shown in Scheme (XI), higher molecular weights are generally obtained by balancing the stoichiometry so that the amounts of each reactive group are about equal, except where noted below.

Preferred polydioxaborines contain linkages between dioxaborine groups that are formed by high yield reactions between the reactive groups of the dioxaborine monomers discussed above. Preferred linkages include ester, amide, urethane, siloxane, amine, and carbonate. Ester linkages are preferably formed by reaction between monomers comprising the following pairs of reactive groups: hydroxyl and carboxylic acid, hydroxyl and alkyl ester, preferably methyl ester, and hydroxyl and acid halide. The hydroxyl group is preferably a phenol (attached to an aromatic group). Polydioxaborines that contain ester linkages can also be formed by the reaction of a diol with an acid anhydride, where the diol and/or the acid anhydride comprise a dioxaborine group. The reaction between hydroxyl and acid halide is preferred because the other reactions involve the elimination of water, typically under basic conditions that may adversely affect the dioxaborine. The reaction tends to be faster when the hydroxyl group is attached to an aromatic group. The reaction between hydroxyl and acid halide, preferably acid chloride, is preferably conducted at room temperature or below in a dry polar aprotic solvent. The presence of a non-nucleophilic acid acceptor, such as a trialkylamine, in the reaction mixture may be helpful to capture the acid eliminated during the polymerization, e.g. HCl. The polydioxaborine can be isolated from the resulting solution by adding the solution to an excess of non-solvent, followed by filtration and rinsing. Copolymers can be made by using mixtures of dioxaborine monomers, and/or by intermixing the dioxaborine monomer(s) with other monomers containing the appropriate reactive groups as discussed above. Examples of preferred comonomers include $C_1$–$C_{18}$ diols, $C_1$–$C_{18}$ diacid halides, $C_1$–$C_{18}$ diacids, and $C_1$–$C_{18}$ dialkyl esters.

Amide linkages are preferably formed by reaction between monomers comprising the following pairs of reactive groups: amine and carboxylic acid, and amine and acid halide. Polydioxaborines that contain amide linkages can also be formed by the reaction of a diamine with an acid anhydride, where the diamine and/or the acid anhydride comprise a dioxaborine group. The reaction between amine and acid halide is preferred because the amine is a base that may adversely affect the dioxaborine at high temperatures. The reaction between amine and acid halide, preferably acid chloride, is preferably conducted at room temperature or below in a dry polar aprotic solvent. When a diacid halide monomer and a diamine are used, the polymerization may be conducted under interfacial polymerization conditions in which the diacid halide monomer is dissolved in an organic solvent, the diamine is dissolved in water, and the resulting organic solvent and aqueous solution are stirred together to facilitate polymerization at the interface between the two phases. The presence of a non-nucleophilic acid acceptor, such as a trialkylamine, in the reaction mixture is helpful to capture the acid eliminated during the polymerization, e.g. HCl, and to prevent the acid from protonating the amine and reducing its reactivity. In the case of solution polymerization, the polymer may be isolated by adding the polymer solution to a non-solvent, filtering, rinsing and drying. In the case of interfacial polymerization, the polymer is preferably withdrawn from the stirred mixture over the course of the polymerization. Sulfonamide linkages can also be formed similarly, by reaction between a sulfonyl halide reactive group and an amine. Copolymers can be made by using mixtures of dioxaborine monomers, and/or by intermixing the dioxaborine monomer(s) with other monomers containing the appropriate reactive groups as discussed above. Examples of preferred comonomers include $C_1$–$C_{18}$ diamines, $C_1$–$C_{18}$ diacid halides, $C_1$–$C_{18}$ sulfonyl halides, and $C_1$–$C_{18}$ acid anhydride.

Urethane linkages are preferably formed by reaction between monomers comprising the following pairs of reactive groups: hydroxyl and diisocyanate, or hydroxyl and carbamoyl halide. The hydroxyl group is preferably a phenol (attached to an aromatic group). Urethanes are preferably formed by reacting a monomer containing two hydroxyl groups (a diol) with a monomer containing two isocyanate groups (a diisocyanate), where either or both of the monomers comprises a dioxaborine group. Isocyanates tend to undergo side reactions, so a slight excess of isocyanate groups over hydroxyl groups is preferred. Polymerization is preferably conducted by mixing the monomers together in a dry polar aprotic solvent, more preferably at room temperature or below. The presence of about 0.1% to about 1.0 of a tertiary amine or organometallic catalyst is often helpful. Dibutyltin dilaurate is a preferred catalyst. Copolymers can be made by using mixtures of dioxaborine monomers, and/or by intermixing the dioxaborine monomer(s) with other monomers containing the appropriate reactive groups as discussed above. Examples of preferred comonomers include $C_1$–$C_{18}$ diols, $C_1$–$C_{18}$ diisocyanates, and $C_1$–$C_{18}$ carbamoyl halides.

Dioxaborine polymers that contain siloxane linkages may be prepared from monomers that contain siloxane linkages and terminal functional groups. For example, dioxaborine monomers that contain siloxane polymerizable groups can be polymerized where the polymerizable groups contain reactive groups such as alkene and silane, as shown in Scheme (XII) below:

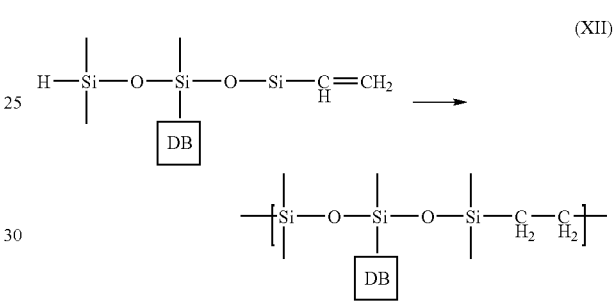

(XII)

The reaction between alkene and silane groups shown in Scheme (XII) is catalyzed by chloroplatinic acid. Siloxane polymerizable groups bearing other pairs of reactive groups can also be employed, e.g., hydroxyl and acetoxy; amine and epoxy, etc. Polymerization may be conducted in an organic solvent such as toluene or tetrahydrofuran, or in the bulk, optionally in the presence of a catalyst. Siloxanes have low glass transition temperatures, good chemical resistance, good transparency, and good thermal properties, and these polydioxaborines are preferred in a number of applications. Copolymers can be made by using mixtures of dioxaborine monomers, and/or by intermixing the dioxaborine monomer(s) with other monomers containing the appropriate reactive groups as discussed above. Examples of preferred comonomers include $Si_3$–$Si_{50}$ dihydroxy siloxanes, $Si_3$–$Si_{50}$ diamino siloxanes, $Si_3$–$Si_{50}$ diacetoxy siloxanes, $Si_3$–$Si_{50}$ diepoxy siloxanes, and $Si_3$–$Si_{50}$ divinyl siloxanes.

Amine linkages are preferably formed by reacting a diepoxy monomer and a diamine monomer, where either or both of the monomers comprises a dioxaborine group, as illustrated in Scheme (XIIII). When a primary diamine monomer is used, the resulting secondary amine linkage in the polymer can undergo further reaction with other epoxy groups, leading to crosslinking. Thus, the ratio of the two monomers is not necessarily 1:1, and is preferably adjusted to control the degree of crosslinking in the resulting polymer. The monomers are preferably intermixed and reacted together in bulk. The amine reactive groups are less active when bonded to an aromatic group, and thus aliphatic diamines are preferred for ambient and low temperature polymerizations. Copolymers can be made by using mixtures of dioxaborine monomers, and/or by intermixing the dioxaborine monomer(s) with other monomers containing the appropriate reactive groups as discussed above. Examples of preferred comonomers include $C_1$–$C_{18}$ diepoxides, preferably bisphenol A, and $C_1$–$C_{18}$ diamines.

(XIIII)

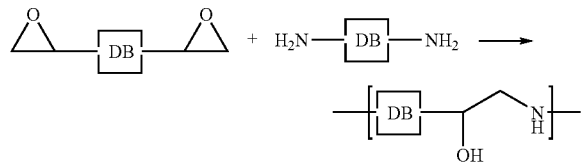

Carbonate linkages may be formed by reacting phosgene with a diol, preferably a diphenol, where the diol contains a dioxaborine group as illustrated in Scheme (XIV). Preferably, the diol and phosgene are intermixed in an organic solvent that contains a non-nucleophilic base, preferably a trialkylamine, to neutralize the by-product hydrogen halide, at a temperature in the range of about 0° C. to about 50° C. Carbonate linkages may also be formed by reacting a dibenzyl halide, preferably a dibenzyl bromide, with potassium carbonate, where the dibenzyl halide contains a dioxaborine group. Preferably, the dibenzyl halide and potassium carbonate are intermixed in a polar aprotic solvent in the presence of a crown ether.

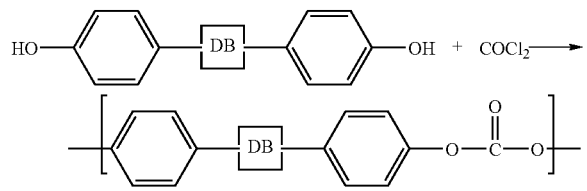

Hydrazide linkages are preferably formed by reacting a hydrazide with an acid halide. Preferably, a dihydrazide monomer and a diacid chloride monomer are polymerized, where either or both of the monomers comprises a dioxaborine group as illustrated in Scheme (XV). The dioxaborine groups can be the same or different. The polymerization is preferably conducted at room temperature or below in a dry polar aprotic solvent. The presence of a non-nucleophilic acid acceptor, such as a trialkylamine, in the reaction mixture may be helpful to capture the acid eliminated during the polymerization, e.g. HCl. The polydioxaborine can be isolated from the resulting solution by adding the solution to an excess of non-solvent, followed by filtration and rinsing. Copolymers can be made by using mixtures of dioxaborine monomers, and/or by intermixing the dioxaborine monomer(s) with other monomers containing the appropriate reactive groups as discussed above. Examples of preferred comonomers include $C_1$–$C_{18}$ dihydrazides and $C_1$–$C_{18}$ diacid halides.

(XV)

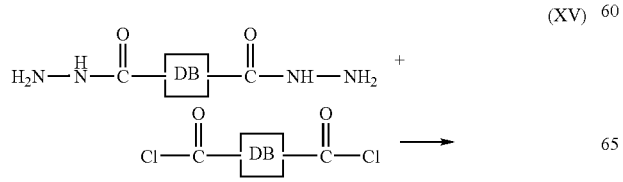

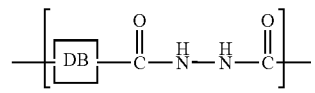

Polydioxaborines that contain hydrazide linkages can be reacted further with amines to form polydioxaborines that contain triazole groups. This reaction is preferably performed in the presence of a strong acid, more preferably polyphosphoric acid, at a temperature in the range of about 100° C. to about 200° C., preferably about 150° C. to about 190° C., for periods of time ranging from about 2 hours to about 1 week. Preferably, polydioxaborines that contain hydrazide linkages are reacted with aniline to form polydioxaborines that contain phenyl-substituted triazole groups.

The weight average molecular weights of the polydioxaborines are preferably about 1,000 or greater, more preferably about 5,000 or greater, most preferably in the range of about 10,000 to about 10,000,000. Molecular weights are preferably measured by high pressure size exclusion chromatography (HPSEC), using polystyrene (PS) standards. In the absence of crosslinking, higher molecular weights are usually easier to achieve by chain polymerization than by step polymerization. Those skilled in the art will understand that many polymerizable groups, e.g., epoxy, may be polymerized by either step or chain polymerization techniques. Preferred polydioxaborines are stable to air and acid, soluble in a variety of polar organic solvents such as acetone and acetonitrile, and have excellent film forming properties. Preferred polydioxaborines are amorphous and have an optical absorbance of about 10 cm$^{-1}$ or less, more preferably about 5 cm$^{-1}$ or less, most preferably about 0.2 cm$^{-1}$ or less, at the particular wavelength used for the measurement, e.g., 780 nm, 633 nm or 532 nm.

Preferred polydioxaborines have a relatively broad polydispersity (ratio of weight average molecular weight, Mw, to number average molecular weight, Mn, as determined by HPSEC using PS standards). For example, preferred polydioxaborines have a polydispersity of about 1.5 or greater, more preferably about 2.0 or greater, most preferably about 3.0 or greater. Polydioxaborines having relatively high polydispersity values tend to have preferred mechanical and thermal properties, such as viscosity, glass transition temperature (Tg), and compatibility with other components, e.g., NLO chromophores, plasticizers, sensitizers, etc. Preferred polydioxaborines have a Tg in the range of about 10° C. to about 80° C., more preferably about 30° C. to about 70° C., as measured by differential scanning calorimetry (DSC) at a scanning rate of 10° C. per minute. The Tg of the polydioxaborine is preferably controlled by incorporating various comonomers as discussed above, using routine experimentation.

NLO Chromophores

A variety of NLO chromophores known to those skilled in the art may be incorporated into the compositions described herein. Preferred NLO chromophores have a FOM as determined by equation (2) of about 10$^{-49}$ esu or greater. Example of preferred NLO chromophores include compounds represented by formulae XVI, XVII and XVIII:

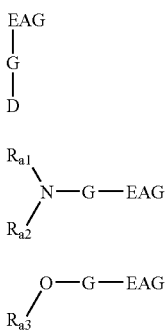

(XVI)

(XVII)

(XVIII)

wherein D is an electron donating group, $R_{a1}$, $R_{a2}$, and $R_{a3}$ are selected from the group consisting of a hydrogen atom, a linear alkyl group with up to 10 carbons, a branched alkyl group with up to 10 carbons, an aromatic group with up to 10 carbons and a linking atom; G is either a methyne or a group having a bridge of π-conjugated bonds; and EAG is an electron accepting group. Other suitable NLO chromophores include those disclosed in U.S. Pat. No. 6,0990,332, which is hereby incorporated by reference in its entirety and particularly for the purpose of describing NLO chromophores. Preferred electron donating groups have a relatively low ionization potential and are capable of bonding to a π-conjugated bridge. Exemplary donors, in order of increasing donor strength, include:

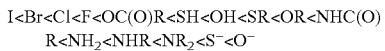

Additional examples of suitable electron donating groups include those described in U.S. Pat. No. 6,267,913, which is hereby incorporated by reference and particularly for the purpose of describing examples of electron donating groups. Preferred electron donating groups include the following:

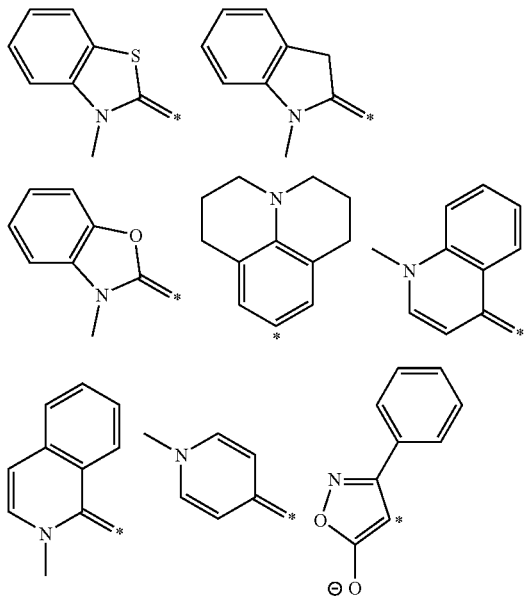

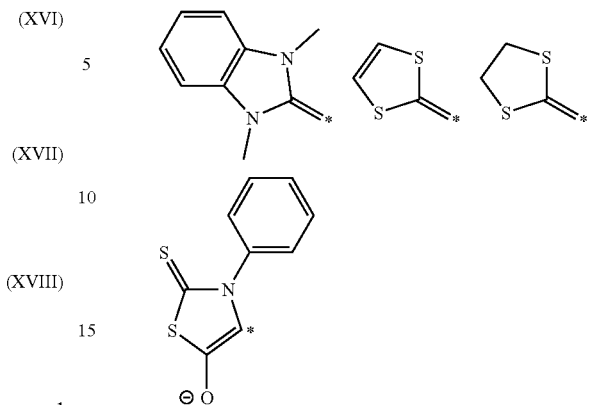

Preferred EAG's have a high electron affinity and are capable of bonding to a π-conjugated bridge. Exemplary acceptors, in order of increasing acceptor strength, include:

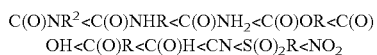

Additional examples of suitable EAG's include those described in U.S. Pat. No. 6,267,913, which is hereby incorporated by reference and particularly for the purpose of describing examples of EAG's. Preferred EAG's include the following:

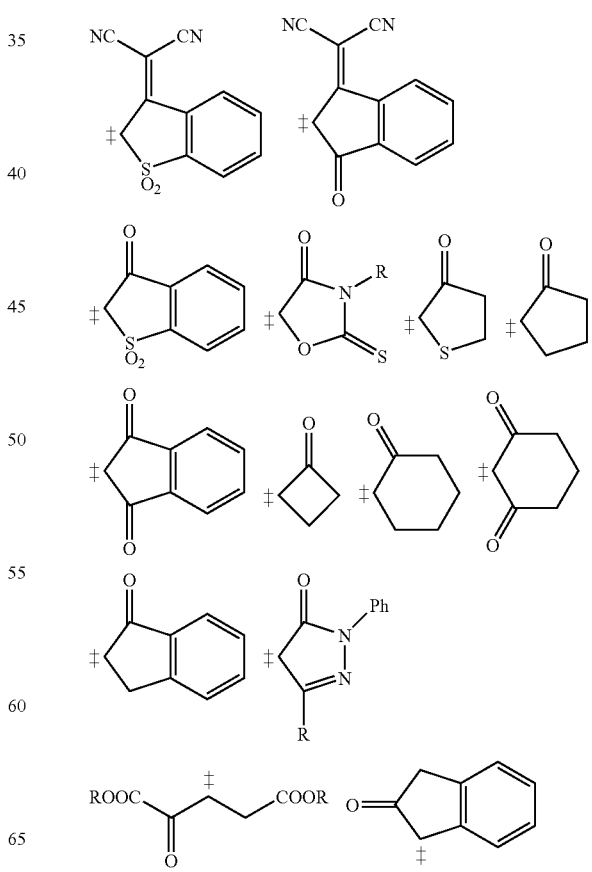

-continued

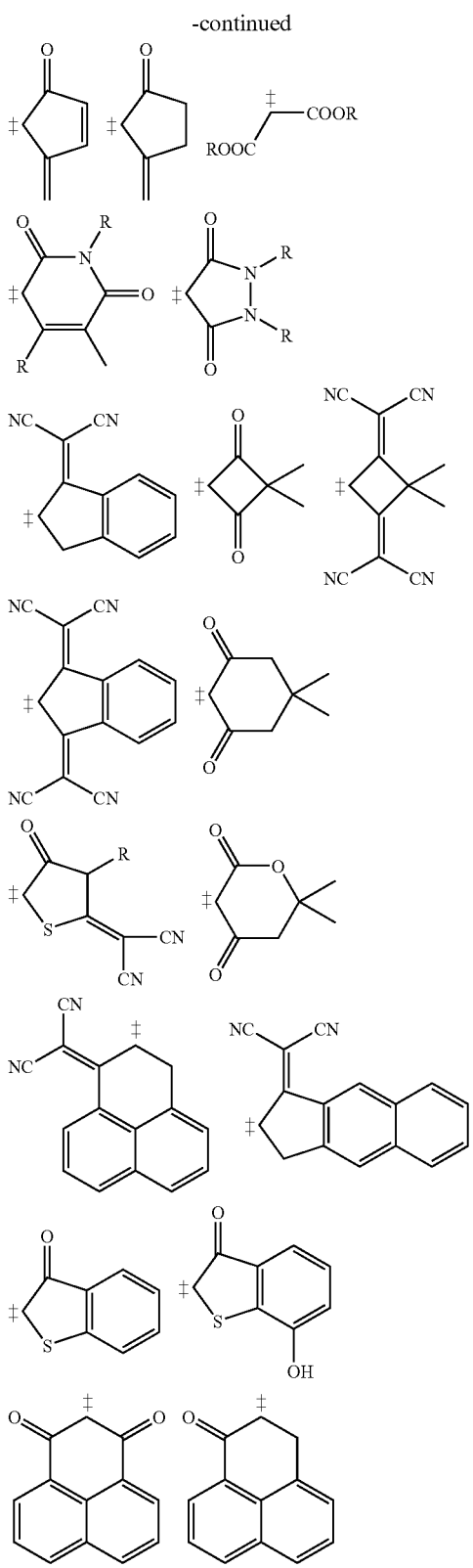

wherein R is selected from the group consisting of a hydrogen atom, a linear alkyl group with up to 10 atoms, a branched alkyl group with up to 10 atoms, and an aromatic group with up to 10 carbons.

In preferred embodiments, G in formulae (XVI), (XVII) and (XVIII) are represented by a structure selected from the group consisting of the structures (XIX), (XX), and (XXI), wherein structures (XIX), (XX), and (XXI) are:

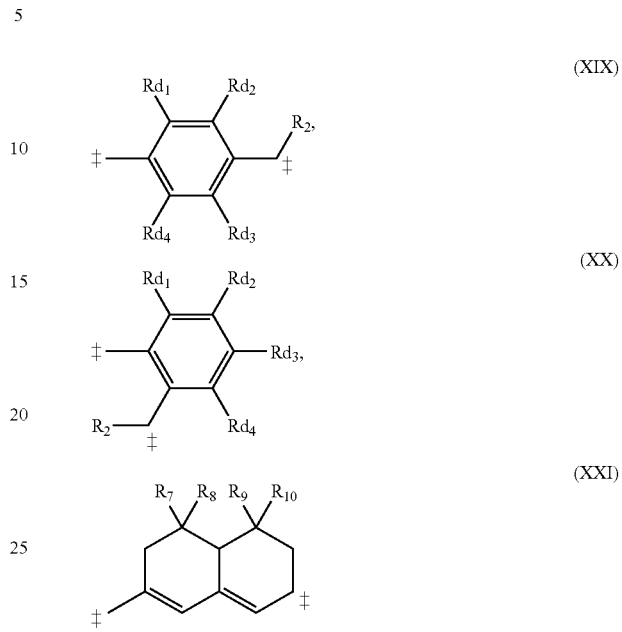

wherein $Rd_1$–$Rd_4$ are each independently selected from the group consisting of a hydrogen atom, a linear alkyl group with up to 10 atoms, a branched alkyl group with up to 10 atoms, and an aromatic group with up to 10 carbons; $R_2$ is selected from the group consisting of a hydrogen atom, a linear alkyl group with up to 10 atoms, a branched alkyl group with up to 10 atoms, and an aromatic group with up to 10 carbons; and $R_{7-10}$ are each independently selected from the group consisting of a hydrogen atom, a linear and branched alkyl group with up to 10 carbons.

In formulae (XVI), (XVII) and (XVIII), EAG is an electron acceptor group, preferably represented by a structure selected from the group consisting of:

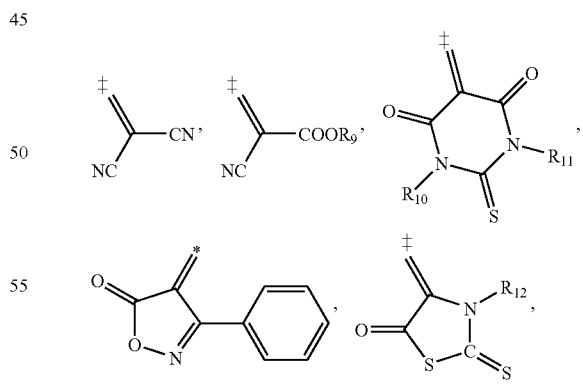

In these structures, $R_9$, $R_{10}$, $R_{11}$, and $R_{12}$ are each independently selected from the group consisting of a hydrogen atom, a linear alkyl group with up to 10 atoms, a branched alkyl group with up to 10 atoms, and an aromatic group with up to 10 carbons.

In a preferred embodiment, G in formulae (XVII) and (XVIII) is represented by the structure (XXII):

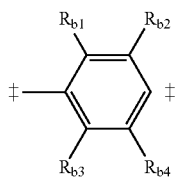

(XXII)

Preferably, EAG in formulae (XVII) and (XVIII) is represented by a moiety selected from the group consisting of:

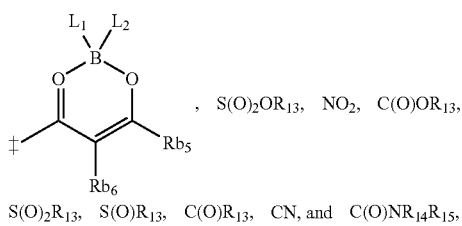

, $S(O)_2OR_{13}$, $NO_2$, $C(O)OR_{13}$, $S(O)_2R_{13}$, $S(O)R_{13}$, $C(O)R_{13}$, $CN$, and $C(O)NR_{14}R_{15}$, wherein C(O) represents an oxygen atom attached to C by a double bond, $S(O)_n$ represents n oxygen atoms connected to S by a double bond, n is an integer in the range of 1 to 4, $R_{b1}$, $R_{b2}$, $R_{b3}$, $R_{b4}$, $R_{b5}$, $R_{b6}$, $R_{13}$, $R_{14}$ and $R_{15}$ are each independently the group consisting of a hydrogen atom, a linear alkyl group with up to 10 atoms, a branched alkyl group with up to 10 atoms, and an aromatic group with up to 10 carbons.

In a most preferred embodiment, the NLO chromophore is 7-DCST:

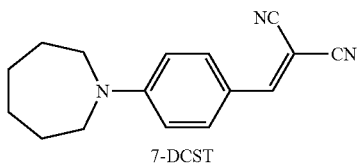

7-DCST

Polydioxaborine Compositions

Preferred compositions comprise a polydioxaborine, an NLO chromophore, and, optionally, one or more other components such as binder polymer, electron injecting sensitizer, hole injecting sensitizer, plasticizer, charge trapping material, dopant, etc. These categories are not mutually exclusive and thus, for example, the NLO chromophore is a photosensitizer in a preferred embodiment. This invention is not bound by theory, but it is believed that the polydioxaborine enables the composition to exhibit photoconductivity and that the NLO chromophore enables the composition to exhibit a non-linear optical response. Preferred polydioxaborine compositions are photorefractive compositions.

Polydioxaborine compositions preferably contain from about 20% to about 99% polydioxaborine, preferably about 50% to about 80% polydioxaborine, by weight based on total weight, and about 1% to about 80%, preferably about 10% to about 50%, of NLO chromophore, same basis. The NLO chromophore may be incorporated into the composition in various ways, e.g., dispersed in the polydioxaborine composition, attached to the polydioxaborine polymer, attached to another polymer that is intermixed with the polydioxaborine polymer, etc.

Polydioxaborine compositions preferably have a Tg that exceeds the expected operating temperature by about 50° C. or less, more preferably by about 10° C. or less. In many cases, the expected operating temperature is about 22° C. Therefore, preferred polydioxaborine compositions typically have a relatively low Tg, e.g., about 100° C. or less, more preferably in the range of about −25° C. to about 70° C., most preferably in the range of about −5° C. to about 40° C., as measured by differential scanning calorimetry (DSC) at a scanning rate of 10° C. per minute. Various plasticizers known in the art may be used to lower Tg. Plasticizer content may be determined by routine experimentation and is typically in the range of about 0% to about 40%, preferably about 10% to about 30%, by weight based on total weight. Excessive amounts of plasticizer tend to adversely affect phase stability and photoconductivity.

A preferred method of lowering the Tg of polydioxaborine acrylates is to copolymerize the dioxaborine acrylate monomer with a plasticizing alkylacrylate comonomer, preferably represented by the formula (XXIII):

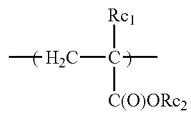

(XXIII)

A preferred alkylacrylate comonomer is an alkyl acrylate or alkyl methacrylate with a linear or branched alkyl group containing between 4 and 10 carbons. Most preferably, the plasticizing comonomer is selected from the group consisting of 2-ethylhexylacrylate, butylacrylate and butylmethacrylate. Typically, the relative concentration of the plasticizing comonomer is about 50% to about 1%, preferably about 30% to about 10% by weight based on total weight. A plasticizer may also be incorporated into the polydioxaborine composition in other ways known to those skilled in the art, e.g., dispersed in the polydioxaborine composition, attached to another polymer that is intermixed with the polydioxaborine polymer, etc.

Preferred polydioxaborine compositions are amorphous. The components in the composition may be crystalline prior to forming the compositions, e.g., see U.S. Pat. No. 5,064,264. The term "amorphous" is used herein in its ordinary sense to refer to materials that are completely amorphous, materials that include highly dispersed areas of crystallization that are insufficient to cause significant scattering or device failure, materials that include finely divided microcrystals with an average diameter less than the wavelength of incident laser light, and metastable amorphous materials that may exhibit substantial phase separation or crystallization over extended periods of time under the conditions of use, but which are amorphous at a given point during their lifetime.

Polydioxaborine compositions may contain various optional components such as binder polymer, NLO chromophore, sensitizer (e.g., electron injecting sensitizer, hole injecting sensitizer), charge trapping material, dopant, etc. In this context, binder polymers are polymers other than polydioxaborine itself. Binder polymers preferably form miscible blends or interpenetrating polymer networks with the polydioxaborine to minimize phase separation. Amounts of binder polymers are preferably in the range of about 0% to about 25%, by weight based on total weight.

Preferred sensitizers are photosensitizers that absorb photons and inject charge into the frontier orbitals of the photoconductive polydioxaborine composition. Various sensitizers known to those skilled in the art may be incorporated into the polydioxaborine compositions in ways known to those skilled in the art, e.g., dispersed in the polydioxaborine composition, attached to the polydioxaborine polymer, attached to another polymer that is intermixed with the polydioxaborine composition, etc. Amounts of sensitizers incorporated into the polydioxaborine compositions are typically in the range of about 0.01% to about 5%, more preferably about 0.1% to about 3%, by weight based on total weight. $C_{60}$ is a preferred photosensitizer.

Surprisingly, it has been discovered that, in polydioxaborine compositions comprising a polydioxaborine and a NLO chromophore, a NLO chromophore having an $EA_v$ lower than that of the polydioxaborine can function as a photosensitizer. Preferably, the $EA_v$ of the NLO chromophore is less than that of the polydioxaborine by an amount in the range of about zero eV to about 1.5 eV. Thus, NLO chromophores are a preferred class of photosensitizers. The $EA_v$ of the dioxaborine monomer and the polydioxaborine can be determined by methods known to those skilled in the art, e.g., as detailed in Douglas A. Skoog, F. James Holler, Timothy A. Nieman, Principles of Instrumental Analysis, Brooks/Cole Publishing, New York, 1997, Sections III and IV, which is incorporated herein by reference.

Charge transfer (CT) complexes are another preferred class of photosensitizers. Preferably, the CT complex has an $EA_v$ that is lower than that of the particular polydioxaborine in the polydioxaborine composition. More preferably, the charge-transfer band of the CT complex is in one or more of the characteristic wavelengths of commonly used visible and near infra-red lasers, e.g., 364 nm, 488 nm, 532 nm, 633 nm, 780 nm and 1064 nm.

Surprisingly, preferred charge transfer complexes may be formed between the polydioxaborine and the NLO chromophore. This invention is not bound by any theory of operation, but it is believed that the charge-transfer complex between the NLO chromophore and the polydioxaborine acts as an efficient photosensitizer because excitation of the charge-transfer band injects an electron into the LUMO of the polydioxaborine. More surprisingly, in many cases, the charge-transfer complex does not significantly decrease the response time of the photorefractive polydioxaborine composition.

Preferred charge transfer complexes may also be formed between the polydioxaborine and an electron donor such as tetrathiafulvene, polythiophene, and poly(p-phenylenevinylene) (PPV).

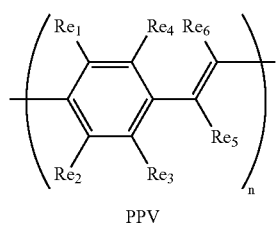

PPV

In the PPV structure shown above, $Re_{1-6}$ is preferably chosen from the group consisting of a hydrogen atom, $C_1$–$C_{10}$ alkyl, an aromatic group with up to 10 carbons, and a heteroatom. Preferably, n is in the range of about 2 to about 10.

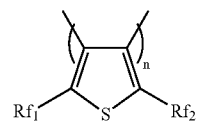

Polythiophene

In the polythiophene structure shown above, $Rf_{1-4}$ is preferably chosen from the group consisting of a hydrogen atom, $C_1$–$C_{10}$ alkyl, an aromatic group with up to 10 carbons, and a heteroatom. Preferably, n is in the range of about 2 to about 10.

Other exemplary donor compounds known to those skilled in the art may also be used to form charge transfer complexes with the polydioxaborine, including the following, in which R is preferably selected from the group consisting of a hydrogen atom, $C_1$–$C_{10}$ alkyl, an aromatic group with up to 10 carbons, and a heteroatom:

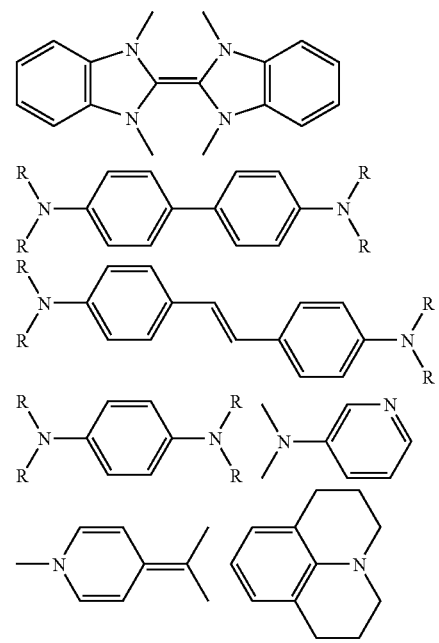

Within the polydioxaborine composition, various impurities, defects such as microcracks and microvoids, chain ends, and local concentration variations of the various components can act as traps for the transported charges, thus decreasing performance. If necessary or desired, charge-trapping materials can be incorporated into the polydioxaborine composition, although typically at the expense of charge mobility. Such charge trapping materials preferably have a higher electron affinity ($EA_v$) than the particular polydioxaborine in the composition. The preferred concentration of the charge trapping material is in the range about 0% to about 10%, by weight based on total. Ferrocinium salts are a preferred charge trapping material.

Preferred polydioxaborine compositions are photorefractive compositions having a reversible diffraction efficiency of about 0.01 (1%) or greater and a photoconductivity of about $10^{-12}$ inverse-ohm-centimeter per watt per square centimeter or greater (normalized to the intensity of the light used in the particular measurement, as illustrated in the examples below). It has now been discovered that the two-beam coupling response of preferred photorefractive polydioxaborine compositions can be significantly enhanced at 633 nm by the addition of electron-rich dopants that do not form charge-transfer complexes with significant absorbance at 633 nm. These dopants include triarylamines, diarylalkylamines and TPD. Specific examples of useful dopants include ethyl carbazole, N,N,N',N'-tetraphenyl-1,4-phenylenediamine, triphenyl amine and N,N,N',N'-tetraphenyl-4,4'-diaminobiphenyl. Dopants may also be incorporated into the polydioxaborine composition in other ways known to those skilled in the art, e.g., dispersed in the polydioxaborine composition, attached to another polymer that is intermixed with the polydioxaborine polymer, etc. Amounts of dopants incorporated into the polydioxaborine compositions are typically in the range of about 0.01% to about 5%, more preferably about 0.1% to about 3%, by weight based on total weight. $C_{60}$ is a preferred photosensitizer.

Preferred polydioxaborine photorefractive compositions are not opaque at the wavelength of operation. Preferably, the optical density of the samples is between about 0.01 and 0.8 as measured by methods known to those skilled in the art and outlined in Douglas A. Skoog, F. James Holler, Timothy A. Nieman, *Principles of Instrumental Analysis*, Brooks/Cole Publishing, New York, 1997, Section III. It is further preferred that the electron-rich dopant has a molar absorptivity less than about 100 mole$^{-1}$ cm$^{-1}$ in the wavelength range of about 500 nm to about 1000 nm as measured by methods known to those skilled in the art and further outlined in Douglas A. Skoog, F. James Holler, Timothy A. Nieman, *Principles of Instrumental Analysis*, Brooks/Cole Publishing, New York, 1997, Section III.

EXAMPLE 1

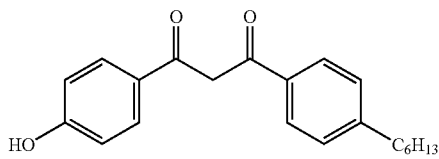

The diketone (1-(4-hydroxyphenyl)-3-(4-hexylphenyl)-1,3-propanedione) was prepared by heating 4-hydroxyacetophenone (6.18 g, 45.4 mmol), 4-(hexyl)methylbenzoate (10.00 g, 45.4 mmol) and sodium hydride (4.36 g, 182 mmol) in (2-methoxyethyl)ether (200 mL) at 120° C. After heating the mixture for 4 days, the solution was cooled to room temperature and quenched with isopropanol. The solvents were removed in vacuo and the residue was triturated with 1M HCl (100 mL) and ethyl acetate (250 mL). The organic layer was successively washed with 1M HCl (200 mL), deionized water (5×200 mL) and brine (1×100 mL). The organic layer was dried over sodium sulfate. Unreacted hydroxyacetophenone was removed by vacuum sublimation. The residue was adsorbed on silica and eluted from silica gel in toluene/ethyl acetate (9:1 v/v) to give the product as a mixture of isomers (low melting orange crystalline solid, 14.26 g, 96.8%). $^1$H NMR (400 MHz, Acetone-$d_6$) δ: (O—H not observed) 7.87 (dd, $J_1$=8 Hz, $J_2$=11.6 Hz, 4H), 7.26 (d, J=8 Hz, 2H), 6.92 (d, J=8 Hz 2H), 6.75 (s, 1H), 2.64 (t, 2H), 1.61 (m, 2H), 1.29 (m, 6H), 0.86 (t, 3H) ppm. $^{13}$C NMR (100 MHz, Acetone-$d_6$) δ: 186.1, 184.3, 160.8, 148.0, 133.1, 129.6, 128.8, 127.1, 115.7, 92.1, 36.1, 31.7, 31.1, 29.0, 22.6, 14.1 ppm.

EXAMPLE 2

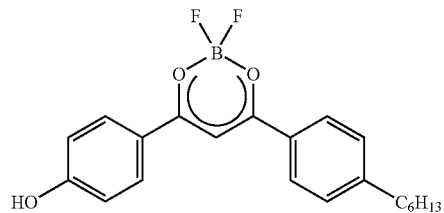

A round bottom flask was charged with a sample of diketone (13.81 g, 42.57 mmol) prepared as described in Example 1, borontrifluoride acetic acid complex (9.60 g, 51.1 mmol) and dichloromethane. The mixture was heated at 50° C. for 12 hours, after which time the mixture was allowed to cool to room temperature. Filtration of the reaction mixture gave the dioxaborine intermediate as a yellow microcrystalline solid (10.89 g, 68.72%). $^1$H NMR (400 MHz, CDCl$_3$) δ: 8.03 (t, J=8.5 Hz, 4H), 7.34 (d, J=8.5 Hz, 2H), 7.04 (s, 1H), 6.96 (d, J=8.5 Hz, 2H), 6.06 (s, 1H), 2.69 (t, J=7.6 Hz, 2H), 1.64 (m, 2H), 1.30 (m, 6H), 0.88 (t, J=6.8 Hz, 3H) ppm. $^{13}$C NMR (100 MHz, CDCl$_3$) δ: 181.6, 162.5, 151.5, 131.8, 129.6, 129.3, 128.9, 124.3, 116.4, 92.2, 36.3, 31.7, 31.0, 29.0, 22.6, 14.1 ppm.

EXAMPLE 3

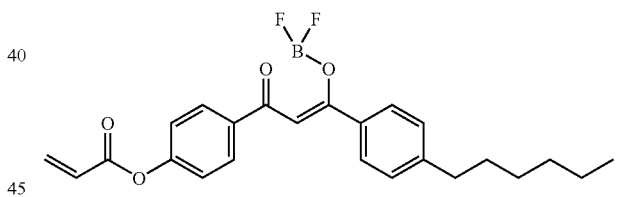

A 3-neck flask was charged with a sample of a dioxaborine intermediate (7.85 g, 21.1 mmol) prepared as described in Example 2 and tetrahydrofuran (THF) (125 mL). The flask was fitted with a drying tube and two addition funnels. Separately, solutions of acryloyl chloride (2.96 g, 32.8 mmol) and triethylamine (7.0 g, 69 mmol) in THF (10 mL) were prepared. The reaction flask was cooled to 0° C. The solutions of triethylamine and acryloyl chloride were added dropwise over 30 minutes. The reaction mixture was then allowed to warm to room temperature overnight. Removal of the solvents in vacuo, followed by filtration through silica (CH$_2$Cl$_2$) and crystallization from toluene/hexanes gave the acrylate monomer product as a yellow powder (8.42 g, 93%). $^1$H NMR (400 MHz, CDCl$_3$) δ: 8.14 (d, J=8.8 Hz, 2H), 8.03 (d, J=8.5 hz, 2H), 7.32 (d, J=8.5 Hz, 4H), 7.10 (s, 1H), 6.62 (d, J=17 Hz, 1H), 6.31 (dd, $J_1$=10.4 Hz, $J_2$=17 Hz, 1H), 6.07 (d, J=10.4 Hz, 1H), 2.66 (t, J=8 Hz, 2H), 1.60 (m, 2H), 1.32 (br m, 6H), 0.84 (t, J=5.6 Hz) ppm. $^{13}$C NMR (100 MHz, CDCl$_3$) δ: 183.3, 181.3, 165.0, 156.3, 152.1, 135.4, 130.5, 129.4, 129.2, 128.4, 122.5, 122.1, 93.0, 36.3, 31.7, 31.0, 29.0, 22.6, 18.4, 14.1 ppm.

EXAMPLE 4

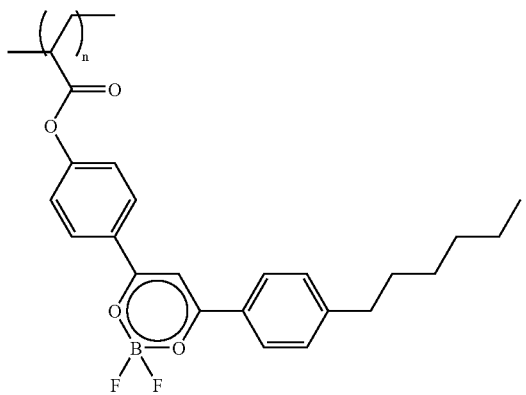

A Schlenk tube was charged with a stirbar, a sample of acrylate monomer (1.00 g, 2.18 mmol) prepared as described in Example 3, 1,1'-azobis-(cyclohexanecarbonitrile) (ACHN) (5 mg) and toluene (10 mL). The resulting slurry was heated to 65° C. in an oil bath until all of the components had dissolved. The solution was then degassed by bubbling a stream of dry argon through it for 15 minutes. Once the mixture was degassed, the bath temperature was raised to 92° C. The reaction mixture was allowed to stir at 92° C. overnight, at which time it was allowed to cool to room temperature. The polymerization was quenched by pouring the reaction mixture into methanol (100 mL). The resulting slurry was stirred for 10 minutes, and then filtered. The solid filtrate was collected, dissolved in $CH_2Cl_2$ (20 mL) and precipitated with methanol (200 mL). The filtrate was collected and dried overnight in the vacuum oven to give the polydioxaborine product as yellow powder (Mw=29,000, PDI=2.7, 0.85 g, 85%). $^1H$ NMR (400 MHz, $CDCl_3$) δ: 8.1–7.7 (br, 4H), 7.3–6.9 (br, 5H), 3.2–3.0, (br, 1H), 2.7–2.4 (br, 2H), 1.6–1.0 (br, 10H), 0.9–0.8 (br, 3H) ppm. $^{13}C$ NMR (100 MHz, $CDCl_3$) δ: 183, 180, 172, 170, 155, 152, 131, 130–128 (br), 122, 93, 36.3, 31.7, 30.9, 29.1, 22.6, 14.1 ppm.

EXAMPLE 5

A round bottom flask was charged with a sample of dioxaborine intermediate (1.83 g, 4.88 mmol) prepared as described in Example 2, acetic acid anhydride (15 mL) and 4-(N,N-dimethylamino)pyridine (DMAP) (15 mg). The mixture was heated to 90° C. overnight, then allowed to cool to RT. The product was eluted from silica gel in a mixture of $CH_2Cl_2$ and hexanes (3:1, v/v) to give the dioxaborine (DB) acetate product as a yellow microcrystalline powder (1.66 g, 81%).

EXAMPLES 6–17

Polydioxaborine compositions were prepared as follows: Two flasks were meticulously cleaned by rinsing with reagent grade toluene three times. The flasks were then blown clean and dry using a stream of filtered Argon. A sample of polydioxaborine (128 mg, 64% by weight) prepared as described in Example 4 and 7-DCST (70 mg, 35% by weight) were then weighed dry and added to one flask. The solid mixture was degassed by repeatedly applying vacuum ($10^{-2}$ torr) followed by flushing the flask with dry argon. A stock solution of a photosensitizer (Table 1) was prepared and degassed with argon. An aliquot of the stock solution of photosensitizer (2.0 mg, 1.0% by weight) was added to the mixture. A stirbar and degassed, anhydrous toluene (10 mL) were added to mixture, and the resulting solution was stirred overnight under argon or until all the components had completely dissolved. In some cases, the sample was sonicated in a sonicating bath for about 30 minutes to about 60 minutes. When all components of the composite mixture were completely dissolved, the solution was filtered through a 0.2 μm PTFE syringe filter into the second flask. The solvent was then rapidly stripped from the mixture on a rotary evaporator and the resulting polydioxaborine composition covered with a porous membrane to prevent dust contamination and further dried at 65° C. in a vacuum oven (2 torr) overnight. The glass transition temperatures of the polydioxaborine compositions shown in Table 1 below were determined by differential scanning calorimetry at a heating rate of 10° C. per minute. The photorefractive articles shown in Table 1 below were prepared by pressing the polydioxaborine compositions between two hot, pre-etched glass-supported ITO electrodes. Glass beads were used to maintain the film of the polydioxaborine composition at the desired thickness, typically 106 micrometers.

The properties of the photorefractive articles shown in Table 1 below were measured in various ways. All nonlinear optical measurements (degenerate four-wave mixing (DFWM), transient four wave mixing (TFWM), and two beam coupling (TBC)) were obtained at a laser intensity of 0.16 $W/cm^2$. The charge-transport mechanisms of the photorefractive articles were determined by two-beam coupling in which the direction of energy transfer was compared to that of a "standard sample" known in the art to have a hole-transport photoconduction mechanism, see E. Hendrickx, et al. "Photoconductive properties of PVK-based photorefractive polymer composites doped with fluorinated styrene chromophores" J. Mater. Chem., Vol. 9, pp. 2251–2258 (1999). The standard sample contained PVK (64.5 weight %), 7-DCST (35 weight %) and $C_{60}$ (0.5 weight %). Using a two-beam coupling geometry known in the art, see U.S. Pat. No. 5,361,148, two mutually coherent interfering laser beams overlapping at angles between 1° and 85° (typically 20°) at a wavelength of 632.8 nm were used to write a phase hologram in the photorefractive article. The photorefractive article was tilted at $\phi_{ext}$ between 1° and 85° (typically 60°). Two coherent p-polarized 632.8 nm laser beams separated from a cw single model (TE $M_{00}$) He—Ne laser were incident upon the sample film. The diameter of the beams was 2.0 mm on the surface of the sample and the power of each beam was about 1.2 mW. During the measurement, an external dc electric field was applied perpendicularly to the sample surface. The tilt angle was $\phi_{ext}$=60° and the angle between two incident beams was $2\theta_{ext}$=20° in air. The power of the each of the transmitted beams 1 and 2 was measured independently. The two beam coupling gain coefficient can be calculated from equation (3):

$$\Gamma = \frac{\cos\phi}{d} \ln\left(\frac{b\gamma}{b+1-\gamma}\right) \quad (3)$$

where d is the thickness of the sample; b and γ are defined as $b=I_2/I_1$, $\gamma=I_{12}/I_1$; $I_1$, $I_{12}$, and $I_2$ are the intensity of beam 1 incident on the sample, the intensity of beam 1 after coupling, and the intensity of beam 2 incident on the sample, respectively. Typically, after the photorefractive grating is built, one of the writing beams will gain energy while the other one loses energy at the same time. The two beam coupling gain Γ is reported at a constant applied voltage of 8,000V. Those skilled in the art understand that when a bias voltage is applied to a material which exhibits a photorefractive response there will be energy transfer from one beam to the second beam. The transmitted power of one beam will therefore increase, while the transmitted power of the second beam will decrease. The direction of energy transfer will depend on both the polarization of the applied voltage and the charge-transport mechanism in the photorefractive material. The direction of the energy exchange can be reversed if the polarization of the applied field is reversed. Additionally, the direction of energy transfer will be opposite in electron-transport materials from that in hole-transport materials. This asymmetric energy transfer demonstrates the existence of a photorefractive grating.

The photorefractive properties of the photorefractive articles shown in Table 1 were determined by degenerate four-wave mixing using a four-wave mixing geometry known in the art (see U.S. Pat. No. 5,064,264). Two coherent s-polarized 632.8 nm laser beams separated from a cw single model (TE $M_{00}$) He—Ne laser were incident upon the sample film. The diameter of the beams was 2.0 mm on the surface of the sample and the power of each beam was about 1.2 mW. During the measurement, an external dc electric field was applied perpendicularly to the sample surface. The tilt angle was $\phi_{ext}=60°$ and the angle between two incident beams was $2\theta_{ext}=20°$ in air. A much weaker beam (beam power about 20 μW) with p-polarization (beam 3) was counter-propagated in the direction of one of the write beams. This weaker, p-polarized beam 3 was used as the probe beam. The diffracted signal was then detected as beam 4. Diffraction efficiency is defined for the purposes of this measurement as $\eta=I_{beam4}/I_{beam3}$, where I is the intensity of the beam. The four-wave mixing efficiency data obtained by varying the applied electric field was fitted according to a simple form of the Kogelnik equation (Equation 4) in which A, B and P are fitting parameters, and $E_{applied}$ is the applied electric field. The diffraction efficiency (Δη) is reported in Table 1 as Δη (bias) where (bias) is the applied field strength at the point of highest diffraction efficiency.

$$\eta = A \sin^2[B \cdot E_{applied}{}^P] \quad (4)$$

The transient DFWM response (TFWM) of the photorefractive samples was obtained by setting the bias to a fixed value with one of the writing beams blocked, and acquiring data as the writing beam was unblocked. Commonly, the fixed bias (HV) was set at 6,000 V in these experiments. The time dependent refractive index grating response can then be fitted to the biexponential function equation (5):

$$\eta = A \sin^2[B \cdot (131\ me^{-t/t1} - (1-m)e^{-t/t2})] \quad (5)$$

where A, B and m are fitting parameters, and t1 and t2 are fast and slow response lifetime, respectively. The fast component of the response time t(f), slow component of the response time t(s) and the weighting factor m (in %) are shown in Table 1.

TABLE 1

Properties of Polydioxaborine Composition (Examples 6–17)

| No. | Composition[1] (wt:wt) | Photo-sensitizer | η (bias) | t(f) (ms) | t(s) (ms) | m (%) | Tg (° C.) | Transport Mechanism |
|---|---|---|---|---|---|---|---|---|
| 6 | pDB:7-DCST:$C_{60}$ (64.5:35:0.5) | $C_{60}$ | 25% (8000 V) | 99.2 | 680 | 34 | 42 | Hole |
| 7 | ppDB:DBacetate:7-DCST:$C_{60}$ (49:16:35:0.5) | $C_{60}$ | 21% (6500 V) | 59.9 | 430 | 27 | 1.0 | Hole |
| 8 | pDB:7DCST:$C_{60}$ (65:35:0.5) | $C_{60}$ | 39% (8000 V) | 433 | 2,260 | 34 | 42 | Hole |
| 9 | pDB:7-DCST:$C_{60}$ (65:35:0.5) | $C_{60}$ | 20% (8000 V) | 162 | 5,710 | 65 | 42 | Hole |
| 10 | PMMA:7-DCST:$C_{60}$ (65:35:0.5) | $C_{60}$ | 20 (8000 V) | 162 | 5,710 | 65 | 90 | Hole |
| 11 | pDB:7DCST:TNFDM (64:35:1) | TNFDM | 42% (5000 V) | 405 | 1,760 | 59 | 42 | Hole |
| 12 | pDB:7DCST:TTF (64:35:1) | TTF | 16% (8000 V) | 1043 | — | — | 42 | electron |
| 13 | pDB:7DCST (65:35) | 7-DCST/pDB C-T complex | 5.2% (7000 V) | 278 | — | — | 42 | electron |
| 14 | pDB:7DCST:TPD (64:35:1) | TPD | 39% (5750 V) | 363 | 2,100 | 26 | 42 | electron |
| 15 | pDB:7-DCST:polyTPD (65:35:1) (prepared in air) | polyTPD | 30% (6500 V) | 233 | 1,400 | 48 | 42 | electron |

TABLE 1-continued

Properties of Polydioxaborine Composition (Examples 6–17)

| No. | Composition[1] (wt:wt) | Photo-sensitizer | η (bias) | t(f) (ms) | t(s) (ms) | m (%) | Tg (° C.) | Transport Mechanism |
|---|---|---|---|---|---|---|---|---|
| 16 | pDB:7-DCST:polyTPD (65:35:1) (prepared in glove box) | polyTPD | 70% (6500 V) | 152 | 1,140 | 41 | 42 | electron |
| 17 | pDB:7-DCST:polythiophene (65:35:0.01) | poly-thiophene | 5% (7000 V) | 219 | 3,650 | 70 | 42 | electron |

[1]The abbreviations in this column are defined as follows: pDB refers to a polydioxaborine prepared as described in Example 4, PMMA is polymethylmethacrylate (Mw = 1.1 Mdaltons), and DBacetate, TNFDM, TTF, TPD and polyTPD have the structures shown below:

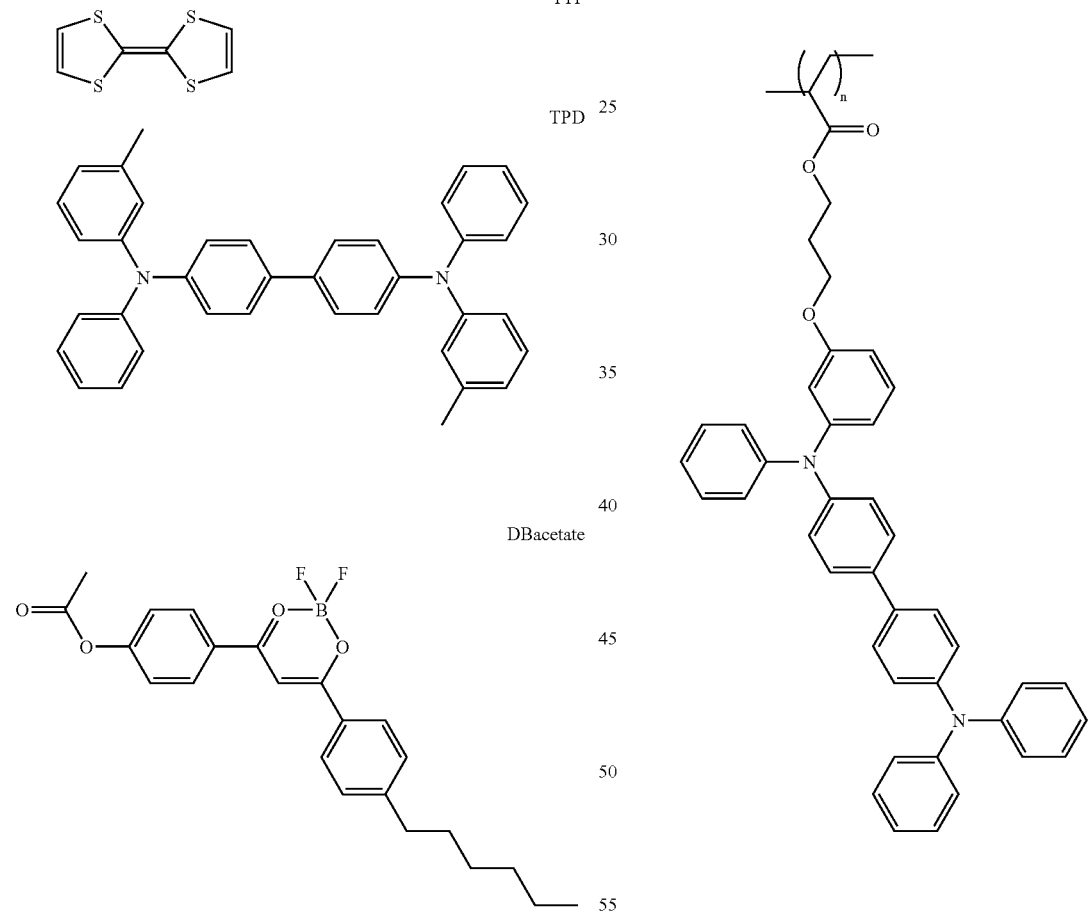

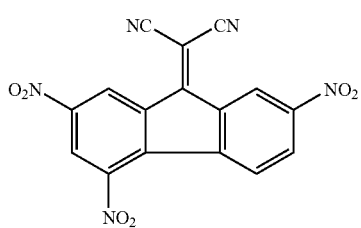

What is claimed is:

1. A composition comprising a polydioxaborine having a weight average molecular weight of about 1,000 or greater and an NLO chromophore.

2. The composition of claim 1 that is photoconductive.

3. The composition of claim 2 that is photorefractive.

4. The composition of claim 1 in which the polydioxaborine comprises a dioxaborine group of the formula (I):

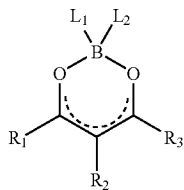

(I)

wherein $R_1$, $R_2$, $R_3$, $L_1$ and $L_2$ are each independently selected from the group consisting of hydrogen, linking atom, electron withdrawing group, and electron donating group.

5. The composition of claim 4 in which $R_1$, $R_2$, $R_3$, $L_1$ and $L_2$ are each independently selected from the group consisting of a hydrogen atom, a linking atom, $C_1$–$C_{10}$ alkyl, and $C_6$–$C_{10}$ aryl.

6. The composition of claim 4, in which $L_1$ and $L_2$ are each independently selected from the group consisting of hydrogen, linking atom, halogen, $C_1$–$C_6$ alkyl, $C_1$–$C_6$ alkoxy, $C_1$–$C_6$ thioalkyl, nitrile, and a bridging ligand formed by $L_1$ and $L_2$ together;

$R_1$ and $R_3$ are each independently selected from the group consisting of hydrogen, linking atom, carboxylate, carboxylic acid, aldehyde, amide, epoxy, acid chloride, anhydride, nitrile, sulfonate, sulfonic acid, phosphonate, nitrate, nitro, $C_1$–$C_{18}$ alkoxy, $C_1$–$C_{18}$ alkyl, $C_1$–$C_{18}$ fluoroalkyl, hydroxyl, $C_{12}$–$C_{20}$ diarylamino, $C_2$–$C_{10}$ dialkylamino, $C_1$–$C_6$ alkylhalide, $C_1$–$C_6$ nitroalkyl, $C_1$–$C_6$ alkanoic acid, $C_1$–$C_6$ alkylamide, $C_6$–$C_{10}$ aryl, $C_6$–$C_{10}$ aryloxy, $C_7$–$C_{20}$ alkylaryl, and $C_7$–$C_{20}$ alkylaryloxy; and $R_2$ is selected from the group consisting of hydrogen, linking atom, carboxylate, carboxylic acid, aldehyde, amide, epoxy, acid chloride, anhydride, nitrile, sulfonate, sulfonic acid, phosphonate, nitrate, nitro, $C_1$–$C_{18}$ alkoxy, $C_1$–$C_{18}$ alkyl, $C_1$–$C_{18}$ fluoroalkyl, $C_{12}$–$C_{20}$ diarylamino, $C_1$–$C_6$ alkylhalide, $C_1$–$C_6$ nitroalkyl, $C_1$–$C_6$ alkanoic acid, $C_1$–$C_6$ alkylamide, $C_7$–$C_{20}$ alkylaryl, and $C_7$–$C_{20}$ alkylaryloxy.

7. The composition of claim 4 in which the linking atom is selected from the group consisting of carbon atom, nitrogen atom, oxygen atom, and sulfur atom.

8. The composition of claim 4 in which $L_1$ and $L_2$ are each independently a halogen selected from the group consisting of fluoro, chloro, and bromo; $R_1$ is a linking atom, $R_2$ is hydrogen, and $R_3$ is selected from the group consisting of hydrogen, $C_1$–$C_{18}$ alkyl, $C_1$–$C_{18}$ alkoxy, $C_6$–$C_{10}$ aryl, $C_6$–$C_{10}$ aryloxy, $C_7$–$C_{20}$ alkylaryl, and $C_7$–$C_{20}$ alkylaryloxy.

9. The composition of claim 4 in which only one of $R_1$, $R_2$ $R_3$, $L_1$ and $L_2$ is a linking atom.

10. The composition of claim 4 in which two of $R_1$, $R_2$ $R_3$, $L_1$ and $L_2$ are linking atoms.

11. The composition of claim 1 in which the polydioxaborine comprises a recurring unit of the formula (II)

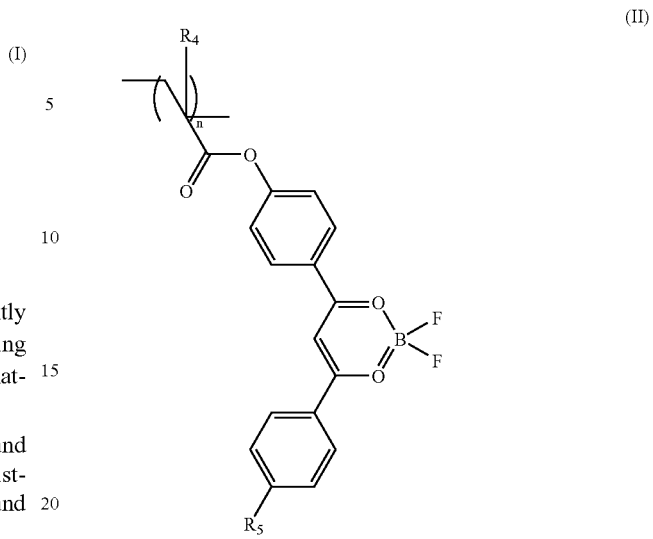

(II)

in which $R_4$ and $R_5$ are each independently selected from the group consisting of a hydrogen atom, $C_1$–$C_{10}$ alkyl, and $C_6$–$C_{10}$ aryl.

12. The composition of claim 1 in which the NLO chromophore has a photorefractive figure of merit of about $1 \times 10^{-49}$ esu or greater.

13. The composition of claim 12 in which the NLO chromophore is a compound having a formula selected from the group consisting of formula (IIIa), formula (IIIb), and formula (IIIc):

(IIIa)

(IIIb)

(IIIc)

in which $R_{a1}$, $R_{a2}$, and $R_{a3}$ are each individually selected from the group consisting of a hydrogen atom, $C_1$–$C_{10}$ alkyl, and $C_6$–$C_{10}$ aryl; G is a π-conjugated bridge; and EAG is an electron acceptor group.

14. The composition of claim 13 in which G is represented by a structure selected from the group consisting of an alkene, a 1,3-diene, a 1,3,5 triene, a structure of the formula (V), a structure of the formula (VI), and a structure of the formula (VII);

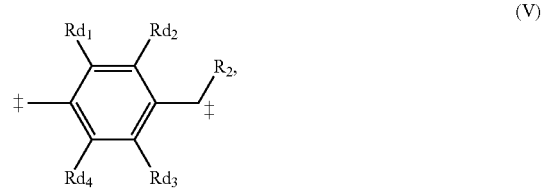

(V)

-continued

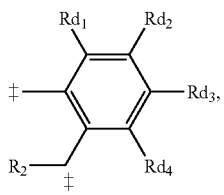
(VI)

wherein Rd$_1$–Rd$_4$ are each independently selected from the group consisting of a hydrogen atom, C$_1$–C$_{10}$ alkyl, and C$_6$–C$_{10}$ aryl;

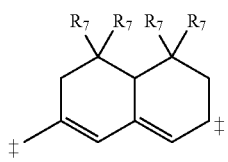
(VII)

wherein each R$_7$ individually represents H or C$_1$–C$_{10}$ alkyl; and wherein EAG is an electron acceptor group represented by a structure selected from the group consisting of

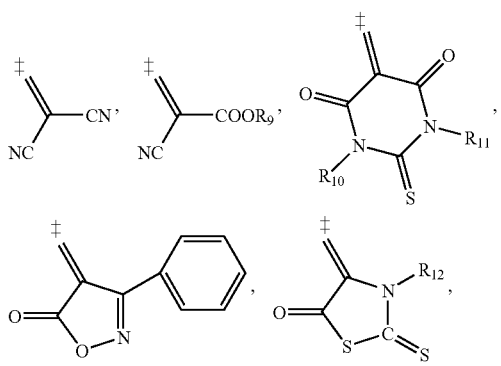

wherein R$_9$, R$_{10}$, R$_{11}$, and R$_{12}$ are each independently selected from the group consisting of a hydrogen atom, C$_1$–C$_{10}$ alkyl, and C$_6$–C$_{10}$ aryl.

15. The composition of claim 13 in which G in formula (IIIa) is represented by the formula (VIII):

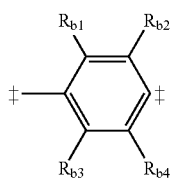
(VIII)

wherein EAG is selected from the group consisting of SO$_3$R$_{13}$, NO$_2$, C(O)OR$_{13}$, SO$_2$R$_{13}$, S(O)R$_{13}$, C(O)R$_{13}$, CN, and C(O)NR$_{14}$R$_{15}$, in which C(O) represents a carbonyl group and S(O) represents a sulfoxide group; and wherein R$_{b1}$, R$_{b2}$, R$_{b3}$, R$_{b4}$, R$_{b5}$, R$_{13}$, R$_{14}$, and R$_{15}$ are each independently selected from the group consisting of a hydrogen atom, C$_1$–C$_{10}$ alkyl, and C$_6$–C$_{10}$ aryl.

16. The composition of claim 14 in which the NLO chromophore is (4-(homopiperidinyl)benzylidene)malonitrile.

17. The composition of claim 12 in which the NLO chromophore is covalently bonded to the polydioxaborine.

18. The composition of claim 1 in which the polydioxaborine comprises a plasticizing recurring unit.

19. The composition of claim 18 in which the plasticizing recurring unit is represented by the formula (XXIII):

(XXIII)

wherein Rc$_1$ and Rc$_2$ are independently selected from the group consisting of C$_1$–C$_{10}$ alkyl and C$_1$–C$_{10}$ alkenyl.

20. The composition of claim 19 in which (XXIII) is selected from the group consisting of 2-ethylhexylacrylate, butylacrylate, and butylmethacrylate.

21. The composition of claim 20 having a glass transition temperature of about 100° C. or less.

22. A composition comprising a polydioxaborine having a weight average molecular of about 1,000 or greater, an NLO chromophore and a photosensitizer.

23. The composition of claim 22 in which the photosensitizer is a charge-transfer complex.

24. The composition of claim 23 in which the charge-transfer is formed between at least a part of the NLO chromophore and the polydioxaborine.

25. A composition comprising a polydioxaborine and an NLO chromophore, wherein the polydioxaborine comprises a recurring unit of the formula (II):

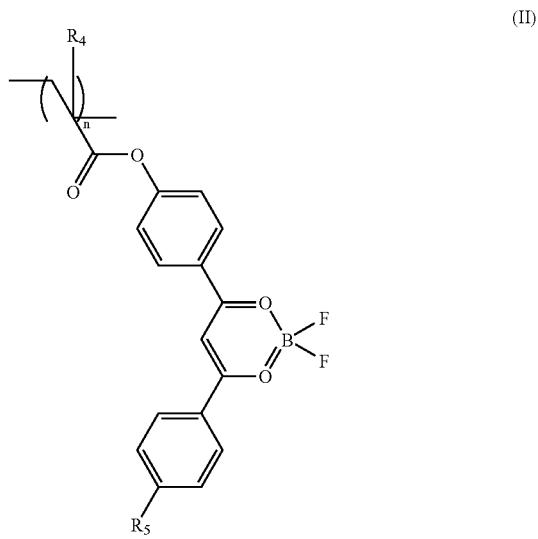
(II)

in which R$_4$ and R$_5$ are each independently selected from the group consisting of a hydrogen atom, C$_1$–C$_{10}$ alkyl, and C$_6$–C$_{10}$ aryl.

* * * * *